United States Patent
Phan et al.

(10) Patent No.: US 10,726,273 B2
(45) Date of Patent: Jul. 28, 2020

(54) METHOD AND APPARATUS FOR SHELF FEATURE AND OBJECT PLACEMENT DETECTION FROM SHELF IMAGES

(71) Applicant: SYMBOL TECHNOLOGIES, LLC, Lincolnshire, IL (US)

(72) Inventors: Raymond Phan, Mississauga (CA); Yan Zhang, Buffalo Grove, IL (US); Richard Jeffrey Rzeszutek, Toronto (CA); Bo Fu, Wheeling, IL (US)

(73) Assignee: Symbol Technologies, LLC, Holtsville, NY (US)

( * ) Notice: Subject to any disclaimer, the term of this patent is extended or adjusted under 35 U.S.C. 154(b) by 101 days.

(21) Appl. No.: 15/583,740

(22) Filed: May 1, 2017

(65) Prior Publication Data
US 2018/0315173 A1 Nov. 1, 2018

(51) Int. Cl.
*G06K 9/46* (2006.01)
*G06K 9/66* (2006.01)
*G06K 9/00* (2006.01)

(52) U.S. Cl.
CPC ....... *G06K 9/00771* (2013.01); *G06K 9/4642* (2013.01)

(58) Field of Classification Search
CPC .............. G06F 19/00; G06K 9/00; G06T 5/40
See application file for complete search history.

(56) References Cited

U.S. PATENT DOCUMENTS

| | | | |
|---|---|---|---|
| 5,209,712 A | 5/1993 | Ferri |
| 5,214,615 A | 5/1993 | Bauer |
| 5,408,322 A | 4/1995 | Hsu et al. |
| 5,414,268 A | 5/1995 | McGee |
| 5,534,762 A | 7/1996 | Kim |
| 5,566,280 A | 10/1996 | Fukui et al. |
| 5,953,055 A | 9/1999 | Huang et al. |
| 5,988,862 A | 11/1999 | Kacyra et al. |
| 6,026,376 A | 2/2000 | Kenney |
| 6,034,379 A | 3/2000 | Bunte et al. |
| 6,075,905 A | 6/2000 | Herman et al. |

(Continued)

FOREIGN PATENT DOCUMENTS

| | | |
|---|---|---|
| CA | 2835830 | 11/2012 |
| CA | 3028156 | 1/2018 |

(Continued)

OTHER PUBLICATIONS

International Search Report and Written Opinion for International Patent Application No. PCT/US2013/070996 dated Apr. 2, 2014.

(Continued)

*Primary Examiner* — Guillermo M Rivera-Martinez

(57) ABSTRACT

A method of detecting a back of a shelf for supporting objects includes: obtaining an image depicting a shelf having a shelf edge and a support surface extending from the shelf edge to a shelf back; decomposing the image into a plurality of patches; for each patch: generating a feature descriptor; based on the feature descriptor, assigning one of a shelf back classification and a non-shelf back classification to the patch; generating a mask corresponding to the image, the mask containing an indication of the classification assigned to each of the patches; and presenting the mask.

20 Claims, 11 Drawing Sheets

(56) References Cited

U.S. PATENT DOCUMENTS

| | | |
|---|---|---|
| 6,115,114 A | 9/2000 | Berg et al. |
| 6,141,293 A | 10/2000 | Amorai-Moriya et al. |
| 6,304,855 B1 | 10/2001 | Burke |
| 6,442,507 B1 | 8/2002 | Skidmore et al. |
| 6,549,825 B2 | 4/2003 | Kurata |
| 6,580,441 B2 | 6/2003 | Schileru-Key |
| 6,711,293 B1 | 3/2004 | Lowe |
| 6,721,769 B1 | 4/2004 | Rappaport et al. |
| 6,836,567 B1 | 12/2004 | Silver et al. |
| 6,995,762 B1 | 2/2006 | Pavlidis et al. |
| 7,090,135 B2 | 8/2006 | Patel |
| 7,137,207 B2 | 11/2006 | Armstrong et al. |
| 7,245,558 B2 | 7/2007 | Willins et al. |
| 7,248,754 B2 | 7/2007 | Cato |
| 7,277,187 B2 | 10/2007 | Smith et al. |
| 7,373,722 B2 | 5/2008 | Cooper et al. |
| 7,474,389 B2 | 1/2009 | Greenberg et al. |
| 7,487,595 B2 | 2/2009 | Armstrong et al. |
| 7,493,336 B2 | 2/2009 | Noonan |
| 7,508,794 B2 | 3/2009 | Feather et al. |
| 7,527,205 B2 | 5/2009 | Zhu et al. |
| 7,605,817 B2 | 10/2009 | Zhang et al. |
| 7,647,752 B2 | 1/2010 | Magnell |
| 7,693,757 B2 | 4/2010 | Zimmerman |
| 7,726,575 B2 | 6/2010 | Wang et al. |
| 7,751,928 B1 | 7/2010 | Antony et al. |
| 7,783,383 B2 | 8/2010 | Eliuk et al. |
| 7,839,531 B2 | 11/2010 | Sugiyama |
| 7,845,560 B2 | 12/2010 | Emanuel et al. |
| 7,885,865 B2 | 2/2011 | Benson et al. |
| 7,925,114 B2 | 4/2011 | Mai et al. |
| 7,957,998 B2 | 6/2011 | Riley et al. |
| 7,996,179 B2 | 8/2011 | Lee et al. |
| 8,009,864 B2 | 8/2011 | Linaker et al. |
| 8,049,621 B1 | 11/2011 | Egan |
| 8,091,782 B2 | 1/2012 | Cato et al. |
| 8,094,902 B2 | 1/2012 | Crandall et al. |
| 8,094,937 B2 | 1/2012 | Teoh et al. |
| 8,132,728 B2 | 3/2012 | Dwinell et al. |
| 8,134,717 B2 | 3/2012 | Pangrazio et al. |
| 8,189,855 B2 | 5/2012 | Opalach et al. |
| 8,199,977 B2 | 6/2012 | Krishnaswamy et al. |
| 8,207,964 B1 | 6/2012 | Meadow et al. |
| 8,233,055 B2 | 7/2012 | Matsunaga et al. |
| 8,265,895 B2 | 9/2012 | Willins et al. |
| 8,277,396 B2 | 10/2012 | Scott et al. |
| 8,284,988 B2 | 10/2012 | Sones et al. |
| 8,423,431 B1 | 4/2013 | Rouaix et al. |
| 8,429,004 B2 | 4/2013 | Hamilton et al. |
| 8,463,079 B2 | 6/2013 | Ackley et al. |
| 8,479,996 B2 | 7/2013 | Barkan et al. |
| 8,520,067 B2 | 8/2013 | Ersue |
| 8,542,252 B2 | 9/2013 | Perez et al. |
| 8,599,303 B2 | 12/2013 | Stettner |
| 8,630,924 B2 | 1/2014 | Groenevelt et al. |
| 8,660,338 B2 | 2/2014 | Ma et al. |
| 8,743,176 B2 | 6/2014 | Stettner et al. |
| 8,757,479 B2 | 6/2014 | Clark et al. |
| 8,812,226 B2 | 8/2014 | Zeng |
| 8,923,893 B2 | 12/2014 | Austin et al. |
| 8,939,369 B2 | 1/2015 | Olmstead et al. |
| 8,954,188 B2 | 2/2015 | Sullivan et al. |
| 8,958,911 B2 | 2/2015 | Wong et al. |
| 8,971,637 B1 | 3/2015 | Rivard |
| 8,989,342 B2 | 3/2015 | Liesenfelt et al. |
| 9,007,601 B2 | 4/2015 | Steffey et al. |
| 9,037,287 B1 | 5/2015 | Grauberger et al. |
| 9,064,394 B1 | 6/2015 | Trundle |
| 9,070,285 B1 | 6/2015 | Ramu et al. |
| 9,129,277 B2 | 9/2015 | MacIntosh |
| 9,135,491 B2 | 9/2015 | Morandi et al. |
| 9,159,047 B2 | 10/2015 | Winkel |
| 9,171,442 B2 | 10/2015 | Clements |
| 9,247,211 B2 | 1/2016 | Zhang et al. |
| 9,329,269 B2 | 5/2016 | Zeng |
| 9,349,076 B1 | 5/2016 | Liu et al. |
| 9,367,831 B1 | 6/2016 | Besehanic |
| 9,380,222 B2 | 6/2016 | Clayton et al. |
| 9,396,554 B2 | 7/2016 | Williams et al. |
| 9,400,170 B2 | 7/2016 | Steffey |
| 9,424,482 B2 | 8/2016 | Patel et al. |
| 9,517,767 B1 | 12/2016 | Kentley et al. |
| 9,542,746 B2 | 1/2017 | Wu et al. |
| 9,549,125 B1 | 1/2017 | Goyal et al. |
| 9,562,971 B2 | 2/2017 | Shenkar et al. |
| 9,565,400 B1 | 2/2017 | Curlander et al. |
| 9,600,731 B2 | 3/2017 | Yasunaga et al. |
| 9,600,892 B2 | 3/2017 | Patel et al. |
| 9,639,935 B1 | 5/2017 | Douady-Pleven et al. |
| 9,697,429 B2 | 7/2017 | Patel et al. |
| 9,766,074 B2 | 9/2017 | Roumeliotis et al. |
| 9,778,388 B1 | 10/2017 | Connor |
| 9,791,862 B1 | 10/2017 | Connor |
| 9,805,240 B1 | 10/2017 | Zheng et al. |
| 9,811,754 B2 | 11/2017 | Schwartz |
| 9,827,683 B1 | 11/2017 | Hance et al. |
| 9,880,009 B2 | 1/2018 | Bell |
| 9,928,708 B2 | 3/2018 | Lin et al. |
| 9,980,009 B2 | 5/2018 | Jiang et al. |
| 9,994,339 B2 | 6/2018 | Colson et al. |
| 10,019,803 B2 | 7/2018 | Venable et al. |
| 10,111,646 B2 | 10/2018 | Nycz et al. |
| 10,127,438 B1* | 11/2018 | Fisher ................ G06K 9/00335 |
| 10,197,400 B2 | 2/2019 | Jesudason et al. |
| 10,210,603 B2 | 2/2019 | Venable et al. |
| 10,229,386 B2 | 3/2019 | Thomas |
| 10,248,653 B2 | 4/2019 | Blassin et al. |
| 10,265,871 B2 | 4/2019 | Hance et al. |
| 10,289,990 B2 | 5/2019 | Rizzolo et al. |
| 10,336,543 B1 | 7/2019 | Sills et al. |
| 10,349,031 B2 | 7/2019 | Deluca |
| 10,352,689 B2 | 7/2019 | Brown et al. |
| 10,394,244 B2 | 8/2019 | Song et al. |
| 2001/0041948 A1 | 11/2001 | Ross et al. |
| 2002/0006231 A1 | 1/2002 | Jayant et al. |
| 2002/0097439 A1 | 7/2002 | Braica |
| 2002/0158453 A1 | 10/2002 | Levine |
| 2002/0164236 A1 | 11/2002 | Fukuhara et al. |
| 2003/0003925 A1 | 1/2003 | Suzuki |
| 2003/0174891 A1 | 9/2003 | Wenzel et al. |
| 2004/0021313 A1 | 2/2004 | Gardner et al. |
| 2004/0131278 A1 | 7/2004 | Imagawa et al. |
| 2004/0240754 A1 | 12/2004 | Smith et al. |
| 2005/0016004 A1 | 1/2005 | Armstrong et al. |
| 2005/0114059 A1 | 5/2005 | Chang et al. |
| 2005/0213082 A1 | 9/2005 | DiBernardo et al. |
| 2005/0213109 A1 | 9/2005 | Schell et al. |
| 2006/0032915 A1 | 2/2006 | Schwartz |
| 2006/0045325 A1 | 3/2006 | Zavadsky et al. |
| 2006/0106742 A1 | 5/2006 | Bochicchio et al. |
| 2006/0285486 A1 | 12/2006 | Roberts et al. |
| 2007/0036398 A1 | 2/2007 | Chen |
| 2007/0074410 A1 | 4/2007 | Armstrong et al. |
| 2007/0272732 A1 | 11/2007 | Hindmon |
| 2008/0002866 A1 | 1/2008 | Fujiwara |
| 2008/0025565 A1 | 1/2008 | Zhang et al. |
| 2008/0027591 A1 | 1/2008 | Lenser et al. |
| 2008/0077511 A1 | 3/2008 | Zimmerman |
| 2008/0159634 A1* | 7/2008 | Sharma .............. G06K 9/00771 |
| | | 382/224 |
| 2008/0164310 A1* | 7/2008 | Dupuy ................... G06F 3/147 |
| | | 235/385 |
| 2008/0175513 A1 | 7/2008 | Lai et al. |
| 2008/0181529 A1 | 7/2008 | Michel et al. |
| 2008/0238919 A1 | 10/2008 | Pack |
| 2008/0294487 A1 | 11/2008 | Nasser |
| 2009/0009123 A1 | 1/2009 | Skaff |
| 2009/0024353 A1 | 1/2009 | Lee et al. |
| 2009/0057411 A1 | 3/2009 | Madej et al. |
| 2009/0059270 A1 | 3/2009 | Opalach et al. |
| 2009/0060349 A1 | 3/2009 | Linaker et al. |
| 2009/0063306 A1 | 3/2009 | Fano et al. |
| 2009/0063307 A1 | 3/2009 | Groenovelt et al. |
| 2009/0074303 A1 | 3/2009 | Filimonova et al. |

(56) References Cited

U.S. PATENT DOCUMENTS

| | | |
|---|---|---|
| 2009/0088975 A1 | 4/2009 | Sato et al. |
| 2009/0103773 A1 | 4/2009 | Wheeler et al. |
| 2009/0125350 A1 | 5/2009 | Lessing et al. |
| 2009/0125535 A1 | 5/2009 | Basso et al. |
| 2009/0152391 A1 | 6/2009 | McWhirk |
| 2009/0160975 A1 | 6/2009 | Kwan |
| 2009/0192921 A1 | 7/2009 | Hicks |
| 2009/0206161 A1 | 8/2009 | Olmstead |
| 2009/0236155 A1 | 9/2009 | Skaff |
| 2009/0252437 A1 | 10/2009 | Li et al. |
| 2009/0323121 A1 | 12/2009 | Valkenburg et al. |
| 2010/0026804 A1 | 2/2010 | Tanizaki et al. |
| 2010/0070365 A1 | 3/2010 | Siotia et al. |
| 2010/0082194 A1 | 4/2010 | Yabushita et al. |
| 2010/0091094 A1 | 4/2010 | Sekowski |
| 2010/0118116 A1 | 5/2010 | Tomasz et al. |
| 2010/0131234 A1 | 5/2010 | Stewart et al. |
| 2010/0141806 A1 | 6/2010 | Uemura et al. |
| 2010/0171826 A1 | 7/2010 | Hamilton et al. |
| 2010/0208039 A1 | 8/2010 | Setettner |
| 2010/0214873 A1 | 8/2010 | Somasundaram et al. |
| 2010/0241289 A1 | 9/2010 | Sandberg |
| 2010/0295850 A1 | 11/2010 | Katz et al. |
| 2010/0315412 A1 | 12/2010 | Sinha et al. |
| 2010/0326939 A1 | 12/2010 | Clark et al. |
| 2011/0047636 A1 | 2/2011 | Stachon et al. |
| 2011/0052043 A1 | 3/2011 | Hyung et al. |
| 2011/0093306 A1 | 4/2011 | Nielsen et al. |
| 2011/0137527 A1 | 6/2011 | Simon et al. |
| 2011/0168774 A1 | 7/2011 | Magal |
| 2011/0172875 A1 | 7/2011 | Gibbs |
| 2011/0216063 A1 | 9/2011 | Hayes |
| 2011/0242286 A1 | 10/2011 | Pace et al. |
| 2011/0254840 A1 | 10/2011 | Halstead |
| 2011/0286007 A1 | 11/2011 | Pangrazio et al. |
| 2011/0288816 A1 | 11/2011 | Thierman |
| 2011/0310088 A1 | 12/2011 | Adabala et al. |
| 2012/0019393 A1 | 1/2012 | Wolinsky et al. |
| 2012/0022913 A1 | 1/2012 | Volkmann et al. |
| 2012/0069051 A1 | 3/2012 | Hagbi et al. |
| 2012/0075342 A1 | 3/2012 | Choubassi et al. |
| 2012/0133639 A1 | 5/2012 | Kopf et al. |
| 2012/0307108 A1 | 6/2012 | Forutanpour |
| 2012/0169530 A1 | 7/2012 | Padmanabhan et al. |
| 2012/0179621 A1 | 7/2012 | Moir et al. |
| 2012/0185112 A1 | 7/2012 | Sung et al. |
| 2012/0194644 A1 | 8/2012 | Newcombe et al. |
| 2012/0197464 A1 | 8/2012 | Wang et al. |
| 2012/0201466 A1 | 8/2012 | Funayama et al. |
| 2012/0209553 A1 | 8/2012 | Doytchinov et al. |
| 2012/0236119 A1 | 9/2012 | Rhee et al. |
| 2012/0249802 A1 | 10/2012 | Taylor |
| 2012/0250978 A1 | 10/2012 | Taylor |
| 2012/0269383 A1 | 10/2012 | Bobbitt et al. |
| 2012/0287249 A1 | 11/2012 | Choo et al. |
| 2012/0323620 A1* | 12/2012 | Hofman ............... G06Q 10/06 705/7.11 |
| 2013/0030700 A1 | 1/2013 | Miller et al. |
| 2013/0119138 A1 | 5/2013 | Winkel |
| 2013/0132913 A1 | 5/2013 | Fu et al. |
| 2013/0134178 A1 | 5/2013 | Lu |
| 2013/0138246 A1 | 5/2013 | Gutmann et al. |
| 2013/0142421 A1 | 6/2013 | Silver et al. |
| 2013/0144565 A1 | 6/2013 | Miller |
| 2013/0154802 A1 | 6/2013 | O'Haire et al. |
| 2013/0156292 A1 | 6/2013 | Chang et al. |
| 2013/0162806 A1 | 6/2013 | Ding et al. |
| 2013/0176398 A1 | 7/2013 | Bonner et al. |
| 2013/0178227 A1 | 7/2013 | Vartanian et al. |
| 2013/0182114 A1 | 7/2013 | Zhang et al. |
| 2013/0226344 A1 | 8/2013 | Wong et al. |
| 2013/0228620 A1 | 9/2013 | Ahem et al. |
| 2013/0235165 A1 | 9/2013 | Gharib et al. |
| 2013/0236089 A1 | 9/2013 | Litvak et al. |
| 2013/0278631 A1 | 10/2013 | Border et al. |
| 2013/0299306 A1 | 11/2013 | Jiang et al. |
| 2013/0299313 A1 | 11/2013 | Baek, IV et al. |
| 2013/0300729 A1 | 11/2013 | Grimaud |
| 2013/0303193 A1 | 11/2013 | Dharwada et al. |
| 2013/0321418 A1 | 12/2013 | Kirk |
| 2013/0329013 A1 | 12/2013 | Metois et al. |
| 2013/0341400 A1 | 12/2013 | Lancaster-Larocque |
| 2014/0002597 A1 | 1/2014 | Taguchi et al. |
| 2014/0003655 A1* | 1/2014 | Gopalakrishnan ............... G06K 9/00771 382/103 |
| 2014/0003727 A1 | 1/2014 | Lortz et al. |
| 2014/0016832 A1* | 1/2014 | Kong .................. A61B 5/1171 382/115 |
| 2014/0019311 A1 | 1/2014 | Tanaka |
| 2014/0025201 A1 | 1/2014 | Ryu et al. |
| 2014/0028837 A1 | 1/2014 | Gao et al. |
| 2014/0047342 A1 | 2/2014 | Breternitz et al. |
| 2014/0049616 A1 | 2/2014 | Stettner |
| 2014/0052555 A1* | 2/2014 | MacIntosh ........... G06Q 20/208 705/23 |
| 2014/0086483 A1 | 3/2014 | Zhang et al. |
| 2014/0098094 A1 | 4/2014 | Neumann et al. |
| 2014/0100813 A1 | 4/2014 | Shaowering |
| 2014/0104413 A1 | 4/2014 | McCloskey et al. |
| 2014/0156133 A1 | 6/2014 | Cullinane et al. |
| 2014/0192050 A1 | 7/2014 | Qiu et al. |
| 2014/0195374 A1 | 7/2014 | Bassemir et al. |
| 2014/0214547 A1 | 7/2014 | Signorelli et al. |
| 2014/0267614 A1 | 9/2014 | Ding et al. |
| 2014/0267688 A1 | 9/2014 | Aich et al. |
| 2014/0277691 A1 | 9/2014 | Jacobus et al. |
| 2014/0277692 A1 | 9/2014 | Buzan et al. |
| 2014/0300637 A1 | 10/2014 | Fan et al. |
| 2014/0344401 A1 | 11/2014 | Varney et al. |
| 2014/0351073 A1 | 11/2014 | Murphy et al. |
| 2014/0369607 A1 | 12/2014 | Patel et al. |
| 2015/0015602 A1 | 1/2015 | Beaudoin |
| 2015/0019391 A1* | 1/2015 | Kumar ................ G07G 1/0036 705/28 |
| 2015/0029339 A1 | 1/2015 | Kobres et al. |
| 2015/0039458 A1* | 2/2015 | Reid .................. G06K 9/00335 705/26.1 |
| 2015/0088618 A1 | 3/2015 | Basir et al. |
| 2015/0088703 A1 | 3/2015 | Yan |
| 2015/0092066 A1 | 4/2015 | Geiss et al. |
| 2015/0106403 A1 | 4/2015 | Haverinen et al. |
| 2015/0117788 A1 | 4/2015 | Patel et al. |
| 2015/0139010 A1 | 5/2015 | Jeong et al. |
| 2015/0154467 A1 | 6/2015 | Feng et al. |
| 2015/0161793 A1 | 6/2015 | Takahashi |
| 2015/0170256 A1 | 6/2015 | Pettyjohn et al. |
| 2015/0181198 A1 | 6/2015 | Baele et al. |
| 2015/0245358 A1 | 8/2015 | Schmidt |
| 2015/0262116 A1* | 9/2015 | Katircioglu .......... G06Q 10/087 705/28 |
| 2015/0279035 A1 | 10/2015 | Wolski et al. |
| 2015/0298317 A1 | 10/2015 | Wang et al. |
| 2015/0352721 A1 | 12/2015 | Wicks et al. |
| 2015/0363625 A1 | 12/2015 | Wu et al. |
| 2015/0363758 A1 | 12/2015 | Wu et al. |
| 2015/0379704 A1 | 12/2015 | Chandrasekar et al. |
| 2016/0026253 A1 | 1/2016 | Bradski et al. |
| 2016/0044862 A1 | 2/2016 | Kocer |
| 2016/0061591 A1 | 3/2016 | Pangrazio et al. |
| 2016/0070981 A1 | 3/2016 | Sasaki et al. |
| 2016/0092943 A1 | 3/2016 | Vigier et al. |
| 2016/0012588 A1 | 4/2016 | Taguchi et al. |
| 2016/0104041 A1 | 4/2016 | bowers et al. |
| 2016/0107690 A1 | 4/2016 | Oyama et al. |
| 2016/0112628 A1 | 4/2016 | Super et al. |
| 2016/0114488 A1 | 4/2016 | Mascorro Medina et al. |
| 2016/0129592 A1 | 5/2016 | Saboo et al. |
| 2016/0132815 A1 | 5/2016 | Itoko et al. |
| 2016/0150217 A1 | 5/2016 | Popov |
| 2016/0156898 A1 | 6/2016 | Ren et al. |
| 2016/0163067 A1 | 6/2016 | Williams et al. |
| 2016/0171336 A1 | 6/2016 | Schwartz |
| 2016/0171429 A1 | 6/2016 | Schwartz |

(56) References Cited

U.S. PATENT DOCUMENTS

| | | |
|---|---|---|
| 2016/0171707 A1 | 6/2016 | Schwartz |
| 2016/0185347 A1 | 6/2016 | Lefevre et al. |
| 2016/0191759 A1 | 6/2016 | Somanath et al. |
| 2016/0253735 A1* | 9/2016 | Scudillo .................. G06Q 30/06 705/14.58 |
| 2016/0313133 A1 | 10/2016 | Zang et al. |
| 2016/0328618 A1 | 11/2016 | Patel et al. |
| 2016/0353099 A1 | 12/2016 | Thomson et al. |
| 2016/0364634 A1 | 12/2016 | Davis et al. |
| 2017/0004649 A1 | 1/2017 | Collet Romea et al. |
| 2017/0011281 A1 | 1/2017 | Dijkman et al. |
| 2017/0011308 A1 | 1/2017 | Sun et al. |
| 2017/0032311 A1 | 2/2017 | Rizzolo et al. |
| 2017/0041553 A1 | 2/2017 | Cao et al. |
| 2017/0066459 A1 | 3/2017 | Singh |
| 2017/0074659 A1 | 3/2017 | Giurgiu et al. |
| 2017/0150129 A1 | 5/2017 | Pangrazio |
| 2017/0193434 A1 | 7/2017 | Shah et al. |
| 2017/0219338 A1 | 8/2017 | Brown et al. |
| 2017/0219353 A1 | 8/2017 | Alesiani |
| 2017/0227645 A1 | 8/2017 | Swope et al. |
| 2017/0227647 A1 | 8/2017 | Baik |
| 2017/0228885 A1 | 8/2017 | Baumgartner |
| 2017/0261993 A1 | 9/2017 | Venable et al. |
| 2017/0262724 A1 | 9/2017 | Wu et al. |
| 2017/0280125 A1 | 9/2017 | Brown et al. |
| 2017/0286773 A1* | 10/2017 | Skaff .................. G05D 1/0246 |
| 2017/0286901 A1* | 10/2017 | Skaff .................... G06Q 10/087 |
| 2017/0323376 A1* | 11/2017 | Glaser ................ G06Q 30/0643 |
| 2018/0001481 A1 | 1/2018 | Shah et al. |
| 2018/0005035 A1* | 1/2018 | Bogolea ................. B25J 9/1664 |
| 2018/0005176 A1* | 1/2018 | Williams ............ G06Q 10/087 |
| 2018/0020145 A1 | 1/2018 | Kotfis et al. |
| 2018/0051991 A1 | 2/2018 | Hong |
| 2018/0053091 A1 | 2/2018 | Savvides et al. |
| 2018/0053305 A1 | 2/2018 | Gu et al. |
| 2018/0101813 A1 | 4/2018 | Paat et al. |
| 2018/0114183 A1 | 4/2018 | Howell |
| 2018/0143003 A1 | 5/2018 | Clayton et al. |
| 2018/0174325 A1 | 6/2018 | Fu et al. |
| 2018/0204111 A1* | 7/2018 | Zadeh .................. G06N 3/0436 |
| 2018/0281191 A1 | 10/2018 | Sinyayskiy et al. |
| 2018/0293442 A1* | 10/2018 | Fridental ............ G06K 9/00718 |
| 2018/0313956 A1 | 11/2018 | Rzeszutek et al. |
| 2018/0314260 A1 | 11/2018 | Jen et al. |
| 2018/0314908 A1 | 11/2018 | Lam |
| 2018/0315007 A1 | 11/2018 | Kingsford et al. |
| 2018/0315065 A1 | 11/2018 | Zhang et al. |
| 2018/0315173 A1 | 11/2018 | Phan et al. |
| 2018/0315865 A1 | 11/2018 | Haist et al. |
| 2019/0057588 A1 | 2/2019 | Savvides et al. |
| 2019/0065861 A1 | 2/2019 | Savvides et al. |
| 2019/0073554 A1 | 3/2019 | Rzeszutek |
| 2019/0180150 A1 | 6/2019 | Taylor et al. |
| 2019/0197728 A1 | 6/2019 | Yamao |

FOREIGN PATENT DOCUMENTS

| | | |
|---|---|---|
| CN | 104200086 | 12/2014 |
| CN | 107067382 | 8/2017 |
| EP | 0766098 A1 | 4/1997 |
| EP | 1311993 B1 | 5/2007 |
| EP | 2309378 | 4/2011 |
| EP | 2439487 | 4/2012 |
| EP | 2472475 A1 | 7/2012 |
| EP | 2562688 | 2/2013 |
| EP | 2662831 A2 | 11/2013 |
| EP | 2693362 | 2/2014 |
| GB | 2323238 A | 9/1998 |
| GB | 2330265 A | 4/1999 |
| KR | 101234798 | 1/2009 |
| KR | 1020190031431 | 3/2019 |
| WO | WO 99/23600 | 5/1999 |
| WO | WO 2003002935 | 1/2003 |
| WO | 2003025805 A1 | 3/2003 |
| WO | 2006136958 A3 | 12/2006 |
| WO | 2007042251 A2 | 4/2007 |
| WO | WO 2008057504 | 5/2008 |
| WO | WO 2008154611 | 12/2008 |
| WO | WO 2012103199 | 8/2012 |
| WO | WO 2012103202 | 8/2012 |
| WO | WO 2012154801 | 11/2012 |
| WO | WO 2013165674 | 11/2013 |
| WO | WO 2014066422 | 5/2014 |
| WO | WO 2014092552 | 6/2014 |
| WO | 2014181323 A1 | 11/2014 |
| WO | WO 2015127503 | 9/2015 |
| WO | WO 2016020038 | 2/2016 |
| WO | WO 2018018007 | 1/2018 |
| WO | WO 2019023249 | 1/2019 |

OTHER PUBLICATIONS

International Search Report and Written Opinion for International Patent Application No. PCT/US2013/053212 dated Dec. 1, 2014.

Duda, et al., "Use of the Hough Transformation to Detect Lines and Curves in Pictures", Stanford Research Institute, Menlo Park, California, Graphics and Image Processing, Communications of the ACM, vol. 15, No. 1 (Jan. 1972).

Bohm, "Multi-Image Fusion for Occlusion-Free Facade Texturing", International Archives of the Photogrammetry, Remote Sensing and Spatial Information Sciences, pp. 867-872 (Jan. 2004).

Senthilkumaran, et al., "Edge Detection Techniques for Image Segmentation—A Survey of Soft Computing Approaches", International Journal of Recent Trends in Engineering, vol. 1, No. 2 (May 2009).

Flores, et al., "Removing Pedestrians from Google Street View Images", Computer Vision and Pattern Recognition Workshops, 2010 IEEE Computer Society Conference on, IEE, Piscataway, NJ, pp. 53-58 (Jun. 13, 2010).

Uchiyama, et al., "Removal of Moving Objects from a Street-View Image by Fusing Multiple Image Sequences", Pattern Recognition, 2010, 20th International Conference on, IEEE, Piscataway, NJ, pp. 3456-3459 (Aug. 23, 2010).

Tseng, et al., "A Cloud Removal Approach for Aerial Image Visualization", International Journal of Innovative Computing, Information & Control, vol. 9 No. 6, pp. 2421-2440 (Jun. 2013).

United Kingdom Intellectual Property Office, Combined Search and Examination Report dated Mar. 11, 2015 for GB Patent Application No. 1417218.3.

United Kingdom Intellectual Property Office, Examination Report dated Jan. 22, 2016 for GB Patent Application No. 1417218.3 (2 pages).

United Kingdom Intellectual Property Office, Combined Search and Examination Report dated Jan. 22, 2016 for GB Patent Application No. 1521272.3 (6 pages).

Notice of allowance for U.S. Appl. No. 13/568,175 dated Sep. 23, 2014.

Notice of allowance for U.S. Appl. No. 13/693,503 dated Mar. 11, 2016.

Notice of allowance for U.S. Appl. No. 14/068,495 dated Apr. 25, 2016.

Notice of allowance for U.S. Appl. No. 15/211,103 dated Apr. 5, 2017.

Notice of allowance for U.S. Appl. No. 14/518,091 dated Apr. 12, 2017.

U.S. Appl. No. 15/583,717, filed May 1, 2017.
U.S. Appl. No. 15/583,801, filed May 1, 2017.
U.S. Appl. No. 15/583,680, filed May 1, 2017.
U.S. Appl. No. 15/583,759, filed May 1, 2017.
U.S. Appl. No. 15/583,773, filed May 1, 2017.
U.S. Appl. No. 15/583,786, filed May 1, 2017.
International Patent Application Serial No. PCT/CN2017/083143 filed May 5, 2017.

Hao et al., "Structure-based object detection from scene point clouds," Science Direct, v191, pp. 148-160 (2016).

(56) References Cited

OTHER PUBLICATIONS

Hu et al., "An improved method of discrete point cloud filtering based on complex environment," International Journal of Applied Mathematics and Statistics, v48, i18 (2013).
International Search Report and Written Opinion for corresponding International Patent Application No. PCT/US2016/064110 dated Mar. 20, 2017.
International Search Report and Written Opinion for corresponding International Patent Application No. PCT/US2017/024847 dated Jul. 7, 2017.
International Search Report and Written Opinion for International Application No. PCTAJS2019/025859 dated Jul. 3, 2019.
International Search Report and Written Opinion from International Patent Application No. PCT/US2018/030345 dated Sep. 17, 2018.
International Search Report and Written Opinion from International Patent Application No. PCT/US2018/030360 dated Jul. 9, 2018.
International Search Report and Written Opinion from International Patent Application No. PCT/US2019/025870 dated Jun. 21, 2019.
International Search Report and Written Opinion from International Patent Application No. PCT/US2018/030363 dated Jul. 9, 2018.
International Search Report and Written Opinion from International Patent Application No. PCT/US2019/025849 dated Jul. 9, 2019.
Jadhav et al. "Survey on Spatial Domain dynamic template matching technique for scanning linear barcode," International Journal of scieve and research v 5 n 3, Mar. 2016)(Year: 2016).
Jian Fan et al: "Shelf detection via vanishing point and radial projection", 2014 IEEE International Conference on image processing (ICIP), IEEE, (2014-10-27), pp. 1575-1578.
Kang et al., "Kinematic Path-Tracking of Mobile Robot Using Iterative learning Control", Journal of Robotic Systems, 2005, pp. 111-121.
Kay et al. "Ray Tracing Complex Scenes." ACM SIGGRAPH Computer Graphics, vol. 20, No. 4, ACM, pp. 269-278, 1986.
Kelly et al., "Reactive Nonholonomic Trajectory Generation via Parametric Optimal Control", International Journal of Robotics Research, vol. 22, No. 7-8, pp. 583-601 (Jul. 30, 2013).
Lari, Z., et al., "An adaptive approach for segmentation of 3D laser point cloud." International Archives of the Photogrammertry, Remote sensing and spatial information Sciences, vol. XXXVIII-5/W12, 2011, ISPRS Calgary 2011 Workshop, Aug. 29-31, 2011, Calgary, Canada.
Lecking et al: "Localization in a wide range of industrial environments using relative 3D ceiling features", IEEE, pp. 333-337 (Sep. 15, 2008).
Lee et al. "Statistically Optimized Sampling for Distributed Ray Tracing." ACM SIGGRAPH Computer Graphics, vol. 19, No. 3, ACM, pp. 61-67, 1985.
Li et al., "An improved RANSAC for 3D Point cloud plane segmentation based on normal distribution transformation cells," Remote sensing, V9: 433, pp. 1-16 (2017).
Likhachev, Maxim, and Dave Ferguson. "Planning Long dynamically feasible maneuvers for autonomous vehicles." The international journal of Robotics Reasearch 28.8 (2009): 933-945. (Year:2009).
Marder-Eppstein et al., "The Office Marathon: robust navigation in an indoor office environment," IEEE, 2010 International conference on robotics and automation, May 3-7, 2010, pp. 300-307.
McNaughton, Matthew, et al. "Motion planning for autonomous driving with a conformal spatiotemporal lattice." Robotics and Automation (ICRA), 2011 IEEE International Conference on. IEEE, 2011. (Year: 2011).
Mitra et al., "Estimating surface normals in noisy point cloud data," International Journal of Computational geometry & applications, Jun. 8-10, 2003, pp. 322-328.
N.D.F. Campbell et al. "Automatic 3D Object Segmentation in Multiple Views using Volumetric Graph-Cuts", Journal of Image and Vision Computing, vol. 28, Issue 1, Jan. 2010, pp. 14-25.
Ni et al., "Edge Detection and Feature Line Tracing in 3D-Point Clouds by Analyzing Geometric Properties of Neighborhoods," Remote Sensing, V8 19, pp. 1-20 (2016).
Norriof et al., "Experimental comparison of some classical iterative learning control algorithms", IEEE Transactions on Robotics and Automation, Jun. 2002, pp. 636-641.
Olson, Clark F., etal. "Wide-Baseline Stereo Vision for terrain Mapping" in Machine Vision and Applications, Aug. 2010.
Oriolo et al., "An iterative learning controller for nonholonomic mobile Robots", the international Journal of Robotics Research, Aug. 1997, pp. 954-970.
Ostafew et al., "Visual Teach and Repeat, Repeat, Repeat: Iterative learning control to improve mobile robot path tracking in challenging outdoor environment", IEEE/RSJ International Conference on Intelligent robots and Systems, Nov. 2013, pp. 176-181.
Park et al., "Autonomous mobile robot navigation using passiv rfid in indoor environment," IEEE, Transactions on industrial electronics, vol. 56, issue 7, pp. 2366-2373 (Jul. 2009).
Perveen et al. (An overview of template matching methodologies and its application, International Journal of Research in Computer and Communication Technology, v2n10, Oct. 2013) (Year: 2013).
Pivtoraiko et al., "Differentially constrained mobile robot motion planning in state lattices", journal of field robotics, vol. 26, No. 3, 2009, pp. 308-333.
Pratt W K Ed: "Digital Image processing, 10-image enhancement, 17-image segmentation", Jan. 1, 2001, Digital Image Processing: PIKS Inside, New York: John Wily & Sons, US, pp. 243-258, 551.
Puwein, J., et al."Robust Multi-view camera calibration for wide-baseline camera networks,"in IEEE Workshop on Applications of computer vision (WACV), Jan. 2011.
Rusu, et al. "How to incrementally register pairs of clouds," PCL Library, retrieved from internet on Aug. 22, 2016 [http://pointclouds.org/documentation/tutorials/pairwise_incremental_registration.php].
Rusu, et al. "Spatial Change detection on unorganized point cloud data," PCL Library, retrieved from internet on Aug. 19, 2016 [http://pointclouds.org/documentation/tutorials/octree_change.php].
Schnabel et al. "Efficient RANSAC for Point-Cloud Shape Detection", vol. 0, No. 0, pp. 1-12 (1981).
Szeliski, "Modified Hough Transform", Computer Vision. Copyright 2011, pp. 251-254. Retrieved on Aug. 17, 2017 [http://szeliski.org/book/drafts/SzeliskiBook_20100903_draft.pdf].
Tahir, Rabbani, et al., "Segmentation of point clouds using smoothness constraint,"International Archives of Photogrammetry, Remote Sensing and Spatial Information Sciences 36.5 (Sep. 2006): 248-253.
Trevor et al., "Tables, Counters, and Shelves: Semantic Mapping of Surfaces in 3D," Retrieved from Internet Jul. 3, 2018 @ http://citeseerx.ist.psu.edu/viewdoc/download?doi=10.1.1.703.5365&rep=rep1&type=pdf, pp. 1-6.
United Kingdom Intellectual Property Office, "Combined Search and Examination Report" for GB Patent Application No. 1813580.6 dated Feb. 21, 2019.
Varol Gul et al: "Product placement detection based on image processing", 2014 22nd Signal Processing and Communication Applications Conference (SIU), IEEE, Apr. 23, 2014.
Varol Gul et al: "Toward Retail product recognition on Grocery shelves", Visual Communications and image processing; Jan. 20, 2004; San Jose, (Mar. 4, 2015).
Weber et al., "Methods for Feature Detection in Point clouds," visualization of large and unstructured data sets—IRTG Workshop, pp. 90-99 (2010).
Zhao Zhou et al.: "An Image contrast Enhancement Algorithm Using PLIP-based histogram Modification", 2017 3rd IEEE International Conference on Cybernetics (CYBCON), IEEE, (Jun. 21, 2017).
Ziang Xie et al., "Multimodal Blending for High-Accuracy Instance Recognition", 2013 IEEE RSJ International Conference on Intelligent Robots and Systems, p. 2214-2221.
"Fair Billing with Automatic Dimensioning" pp. 1-4, undated, Copyright Mettler-Toledo International Inc.
"Plane Detection in Point Cloud Data" dated Jan. 25, 2010 by Michael Ying Yang and Wolfgang Forstner, Technical Report 1, 2010, University of Bonn.
"Swift Dimension" Trademark Omniplanar, Copyright 2014.

(56) References Cited

OTHER PUBLICATIONS

Ajmal S. Mian et al., "Three-Dimensional Model Based Object Recognition and Segmentation in Cluttered Scenes", IEEE Transactions on Pattern Analysis and Machine Intelligence, vol. 28, No. 10, Oct. 2006.

Batalin et al., "Mobile robot navigation using a sensor network," IEEE, International Conference on robotics and automation, Apr. 26, May 1, 2004, pp. 636-641.

Bazazian et al., "Fast and Robust Edge Extraction in Unorganized Point clouds," IEEE, 2015 International Conference on Digital Image Computing: Techniques and Applicatoins (DICTA), Nov. 23-25, 2015, pp. 1-8.

Biswas et al. "Depth Camera Based Indoor Mobile Robot Localization and Navigation" Robotics and Automation (ICRA), 2012 IEEE International Conference on IEEE, 2012.

Bristow et al., "A Survey of Iterative Learning Control", IEEE Control Systems, Jun. 2006, pp. 96-114.

Buenaposada et al. "Realtime tracking and estimation of plane pose" Proceedings of the ICPR (Aug. 2002) vol. II, IEEE pp. 697-700.

Carreira et al., "Enhanced PCA-based localization using depth maps with missing data," IEEE, pp. 1-8, Apr. 24, 2013.

Chen et al. "Improving Octree-Based Occupancy Maps Using Environment Sparsity with Application to Aerial Robot Navigation" Robotics and Automation (ICRA), 2017 IEEE.

Cleveland Jonas et al: "Automated System for Semantic Object Labeling with Soft-Object Recognition and Dynamic Programming Segmentation", IEEE Transactions on Automation Science and Engineering, IEEE Service Center, New York, NY (Apr. 1, 2017).

Cook et al., "Distributed Ray Tracing" ACM SIGGRAPH Computer Graphics, vol. 18, No. 3, ACM pp. 137-145, 1984.

Datta, A., et al. "Accurate camera calibration using iterative refinement of control points," in Computer Vision Workshops (ICCV Workshops), 2009.

Deschaud, et al., "A Fast and Accurate Place Detection algoritm for large noisy point clouds using filtered normals and voxel growing," 3DPVT, May 2010, Paris, France. [hal-01097361].

Douillard, Bertrand, et al. "On the segmentation of 3D LIDAR point clouds." Robotics and Automation (ICRA), 2011 IEEE International Conference on IEEE, 2011.

Dubois, M., et al., A comparison of geometric and energy-based point cloud semantic segmentation methods, European Conference on Mobile Robots (ECMR), p. 88-93, 2527, Sep. 25-27, 2013.

F.C.A. Groen et al., "The smallest box around a package," Pattern Recognition, vol. 14, No. 1-6, Jan. 1, 1981, pp. 173-176, XP055237156, GB, ISSN: 0031-3203, DOI: 10.1016/0031-3203(81(90059-5 p. 176-p. 178.

Federico Tombari et al. "Multimodal cue integration through Hypotheses Verification for RGB-D object recognition and 6DOF pose estimation", IEEE International Conference on Robotics and Automation, Jan. 2013.

Glassner, "Space Subdivision for Fast Ray Tracing." IEEE Computer Graphics and Applications, 4.10, pp. 15-24, 1984.

Golovinskiy, Aleksey, et al. "Min-Cut based segmentation of point clouds." Computer Vision Workshops (ICCV Workshops), 2009 IEEE 12th International Conference on. IEEE, 2009.

Hackel et al., "Contour Detection in unstructured 3D point clouds,"IEEE, 2016 Conference on Computer vision and Pattern recognition (CVPR), Jun. 27-30, 2016, pp. 1-9.

* cited by examiner

METHOD AND APPARATUS FOR SHELF FEATURE AND OBJECT PLACEMENT DETECTION FROM SHELF IMAGES

CROSS-REFERENCE TO RELATED APPLICATIONS

This application is related to U.S. Provisional Application No. 62/492,670 entitled "Product Status Detection System," filed on May 1, 2017, by Perrella et al., which is incorporated herein by reference in its entirety.

BACKGROUND

Environments in which inventories of objects are managed, such as products for purchase in a retail environment, may be complex and fluid. For example, a given environment may contain a wide variety of objects with different attributes (size, shape, price and the like). Further, the placement and quantity of the objects in the environment may change frequently. Still further, imaging conditions such as lighting may be variable both over time and at different locations in the environment. These factors may reduce the accuracy with which information concerning the objects may be collected within the environment.

BRIEF DESCRIPTION OF THE SEVERAL VIEWS OF THE DRAWINGS

The accompanying figures, where like reference numerals refer to identical or functionally similar elements throughout the separate views, together with the detailed description below, are incorporated in and form part of the specification, and serve to further illustrate embodiments of concepts that include the claimed invention, and explain various principles and advantages of those embodiments.

Figure 1:
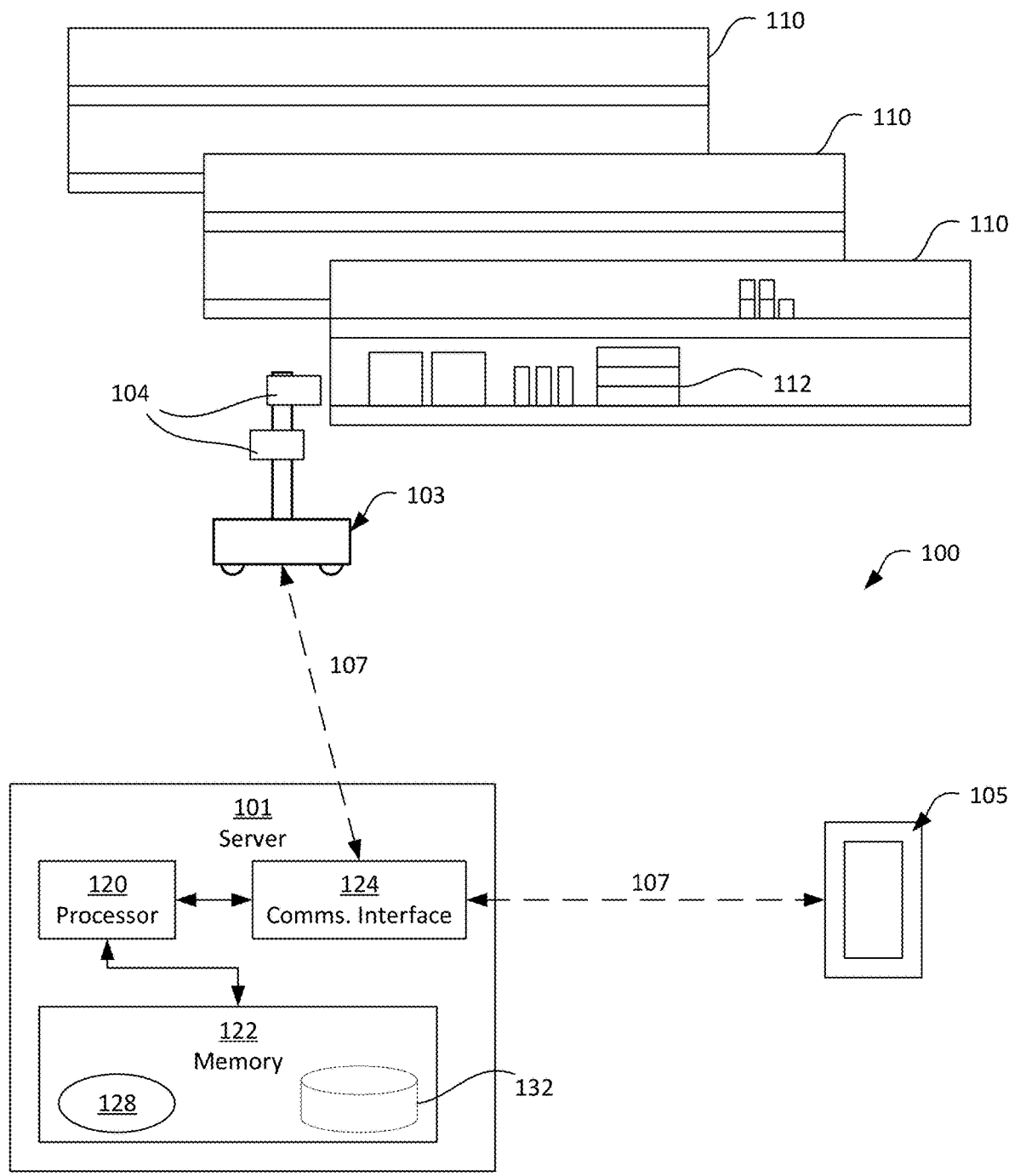
FIG. 1 is a schematic of a mobile automation system.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of embodiments of the present invention.

The apparatus and method components have been represented where appropriate by conventional symbols in the drawings, showing only those specific details that are pertinent to understanding the embodiments of the present invention so as not to obscure the disclosure with details that will be readily apparent to those of ordinary skill in the art having the benefit of the description herein.

DETAILED DESCRIPTION

Environments such as warehouses, retail locations (e.g. grocery stores) and the like typically contain a wide variety of products supported on shelves, for selection and purchase by customers. As a result, the composition of the set of products supported by any given shelf module varies over time, as products are removed and, in some cases, replaced by customers. Products that have been partially or fully depleted typically require restocking, and products that have been incorrectly replaced (referred to as "plugs") typically require relocation to the correct position on the shelves. The detection of restocking or plug issues is conventionally performed by human employees, via visual assessment of the shelves and manual barcode scanning. This form of detection is labor-intensive and therefore costly, as well as error-prone.

Attempts to automate the detection of product status issues such as those mentioned above are complicated by the fluid nature of the environment in which an autonomous data capture system is required to operate. Among other difficulties, digital images of the shelves vary in quality depending on the available lighting, the presence of visual obstructions, and the like. Further, the breadth of products present on the shelves and the variations in their positioning on the shelves reduces the accuracy of machine-generated status detection.

Examples disclosed herein are directed to a method of detecting a back of a shelf for supporting objects, comprising: obtaining an image depicting a shelf having a shelf edge and a support surface extending from the shelf edge to a shelf back; decomposing the image into a plurality of patches; for each patch: generating a feature descriptor; based on the feature descriptor, assigning one of a shelf back classification and a non-shelf back classification to the patch; generating a mask corresponding to the image, the mask containing an indication of the classification assigned to each of the patches; and presenting the mask.

FIG. 1 depicts a mobile automation system 100 in accordance with the teachings of this disclosure. The system 100 includes a server 101 in communication with at least one mobile automation apparatus 103 (also referred to herein simply as the apparatus 103) and at least one mobile device 105 via communication links 107, illustrated in the present example as including wireless links. The system 100 is deployed, in the illustrated example, in a retail environment including a plurality of shelf modules 110 each supporting a plurality of products 112. The shelf modules 110 are typically arranged in a plurality of aisles, each of which includes a plurality of modules aligned end-to-end. More specifically, the apparatus 103 is deployed within the retail environment, and communicates with the server 101 (via the link 107) to navigate, either fully or partially autonomously, the length of at least a portion of the shelves 110. The apparatus 103 is equipped with a plurality of navigation and data capture sensors 104, such as image sensors (e.g. one or more digital cameras), and depth sensors (e.g. one or more Light Detection and Ranging (LIDAR) sensors), structured light sensors, ultrasonic sensors, among others, and is further configured to employ the sensors to capture shelf data. In the present example, the apparatus 103 is configured to capture a series of digital images of the shelves 110, as well as a series of depth measurements, each describing the distance and direction between the apparatus 103 and one or more points on a shelf 110, such as the shelf itself or the product disposed on the shelf.

The server 101 includes a special purpose imaging controller, such as a processor 120, specifically designed to control the mobile automation apparatus 103 to capture data, obtain the captured data via the communications interface 124 and store the captured data in a repository 132 in the memory 122. The server 101 is further configured to perform various post-processing operations on the captured data and to detect the status of the products 112 on the shelves 110. When certain status indicators are detected by the imaging processor 120, the server 101 is also configured to transmit status notifications (e.g. notifications indicating that products are out-of-stock, low stock or misplaced) to the mobile device 105. The processor 120 is interconnected with a non-transitory computer readable storage medium, such as a memory 122, having stored thereon computer readable instructions for identifying back of shelf regions and gaps from captured image data, as discussed in further detail below. The memory 122 includes a combination of volatile (e.g. Random Access Memory or RAM) and non-volatile memory (e.g. read only memory or ROM, Electrically Erasable Programmable Read Only Memory or EEPROM, flash memory). The processor 120 and the memory 122 each comprise one or more integrated circuits. In an embodiment, the processor 120, further includes one or more central processing units (CPUs) and/or graphics processing units (GPUs). In an embodiment, a specially designed integrated circuit, such as a Field Programmable Gate Array (FPGA), is designed to perform the identification of back of shelf regions and gaps from captured image data discussed herein, either alternatively or in addition to the imaging controller/processor 120 and memory 122. As those of skill in the art will realize, the mobile automation apparatus 103 also includes one or more controllers or processors and/or FPGAs, in communication with the controller 120, specifically configured to control navigational and/or data capture aspects of the apparatus 103 either alternatively or in addition to the functionality of the controller 120 discussed herein.

The server 101 also includes a communications interface 124 interconnected with the processor 120. The communications interface 124 includes suitable hardware (e.g. transmitters, receivers, network interface controllers and the like) allowing the server 101 to communicate with other computing devices—particularly the apparatus 103 and the mobile device 105—via the links 107. The links 107 may be direct links, or links that traverse one or more networks, including both local and wide-area networks. The specific components of the communications interface 124 are selected based on the type of network or other links that the server 101 is required to communicate over. In the present example, a wireless local-area network is implemented within the retail environment via the deployment of one or more wireless access points. The links 107 therefore include both wireless links between the apparatus 103 and the mobile device 105 and the above-mentioned access points, and a wired link (e.g. an Ethernet-based link) between the server 101 and the access point.

The memory 122 stores a plurality of applications, each including a plurality of computer readable instructions executable by the processor 120. The execution of the above-mentioned instructions by the processor 120 configures the server 101 to perform various actions discussed herein. The applications stored in the memory 122 include a control application 128, which may also be implemented as a suite of logically distinct applications. In general, via execution of the control application 128 or subcomponents thereof, the processor 120 is configured to implement various functionality. The processor 120, as configured via the execution of the control application 128, is also referred to herein as the controller 120. As will now be apparent, some or all of the functionality implemented by the controller 120 described below may also be performed by preconfigured hardware elements (e.g. one or more ASICs) rather than by execution of the control application 128 by the processor 120.

In the present example, in particular, the server 101 is configured via the execution of the control application 128 by the processor 120, to process image and depth data captured by the apparatus 103 to identify portions of the captured data depicting a back of a shelf 110, and to detect gaps between the products 112 based on those identified portions.

Figure 2:
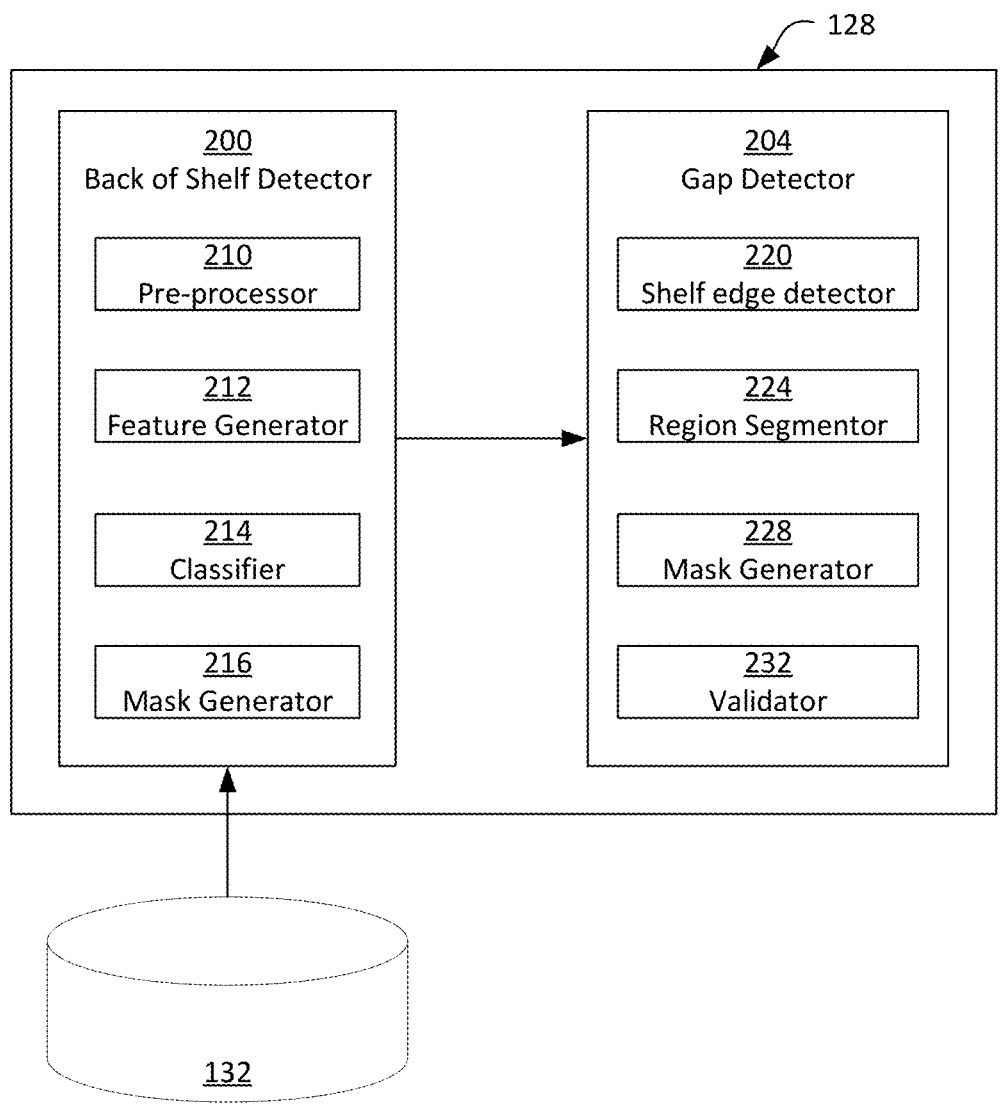
FIG. 2 is a block diagram of certain internal hardware components of the server in the system of FIG. 1.

Turning now to FIG. 2, before describing the operation of the application 128 to identify back of shelf regions and gaps from captured image data, certain components of the application 128 will be described in greater detail. As will be apparent to those skilled in the art, in other examples the components of the application 128 may be separated into distinct applications, or combined into other sets of components. Some or all of the components illustrated in FIG. 2 may also be implemented as dedicated hardware components, such as one or more Application-Specific Integrated Circuits (ASICs) or FPGAs. For example, in one embodiment, to improve reliability and processing speed, at least some of the components of FIG. 2 are programmed directly into the imaging controller 120, which may be an FPGA or an ASIC having circuit and memory configuration specifically designed to optimize image processing of high volume of sensor data received from the mobile automation apparatus 103. In such an embodiment, some or all of the control application 128, discussed below, is an FPGA or an ASIC chip.

The control application 128 includes a back of shelf detector 200 (also referred to herein simply as a detector 200), as well as a gap detector 204. In brief, the detector 200 is configured to process input image data captured by the apparatus 103 to detect areas of the image data that depict a back of the shelves 110. The gap detector 204, meanwhile, is configured to receive the output of the detector 200 in the form of a back-of-shelf mask, and to identify portions of the back-of-shelf mask that correspond to gaps between products 112 on the shelves 110.

More specifically, the detector 200 includes a pre-processor 210 configured to decompose input image data; a feature generator 212 configured to generate feature descriptors for the decomposed image data generated by the pre-processor 120; a classifier 214 configured to assign back of shelf or non-back of shelf classifications to the decomposed image data based on the feature descriptors; and a mask generator 216 configured to generate a back of shelf mask based on the decomposed image data and the output of the classifier 214.

The gap detector 204 includes a shelf edge detector 220 configured to detect or otherwise obtain a location of a shelf edge relative to the input image data; a region segmentor 224 configured to select, based in part of the shelf edge location, areas of the back of shelf mask which may correspond to gaps between the products 112; a mask generator 228 configured to process the segmented back of shelf mask to generate a gap mask; and a validator 232 configured to validate the gap mask based on depth measurements obtained from the apparatus 103.

Figure 3:
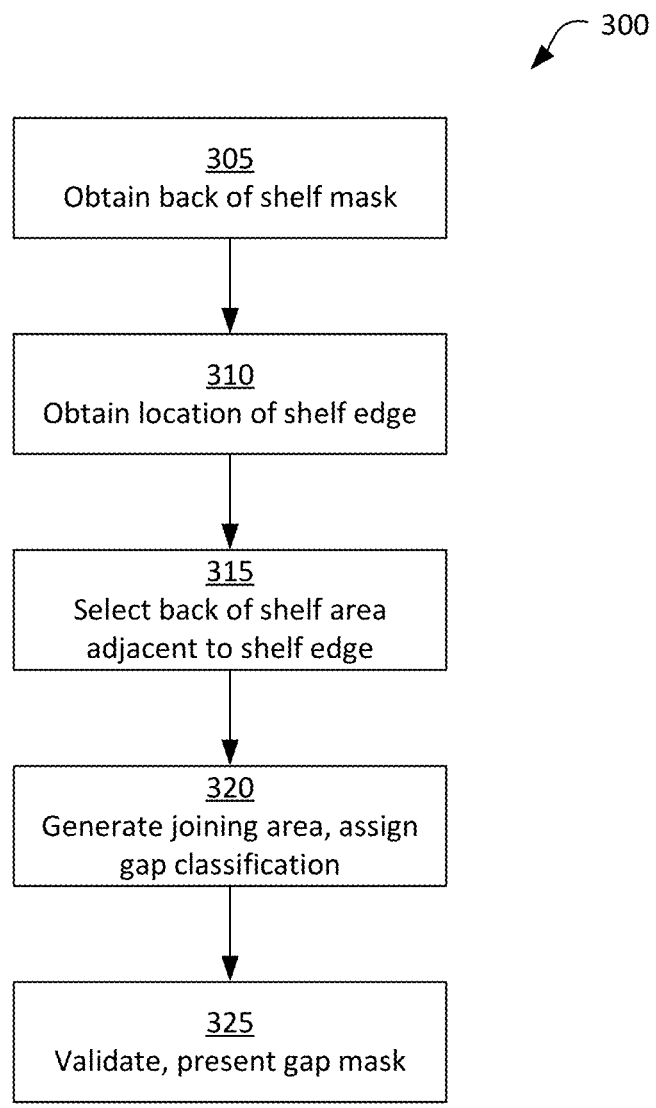
FIG. 3 is a flowchart of a method of gap detection.

Turning to FIG. 3, a method 300 of detecting gaps in an image of a shelf having a shelf edge and a support surface for supporting objects extending from the shelf edge to a shelf back is shown. The method 300 will be described in conjunction with its performance on the system 100 as described above.

As will be apparent, the shelves 110 typically include substantially horizontal (when installed for use) support surfaces extending between a shelf edge and a shelf back. The support surfaces support the products 112, and the shelf back may be visible in between the products 112, as well as over top of the products 112. At block 305, the server 101 is configured to obtain a back of shelf mask generated from an image of a shelf 110 (e.g. captured by the apparatus 103) and containing, for each of a plurality of areas of the mask, indications of a classification assigned to the area and selected from a shelf back classification and a non-shelf back classification. In other words, the back of shelf mask obtained at block 305 identifies areas of an imaged shelf 110 in which the back of the shelf 110 is visible.

Figure 4:
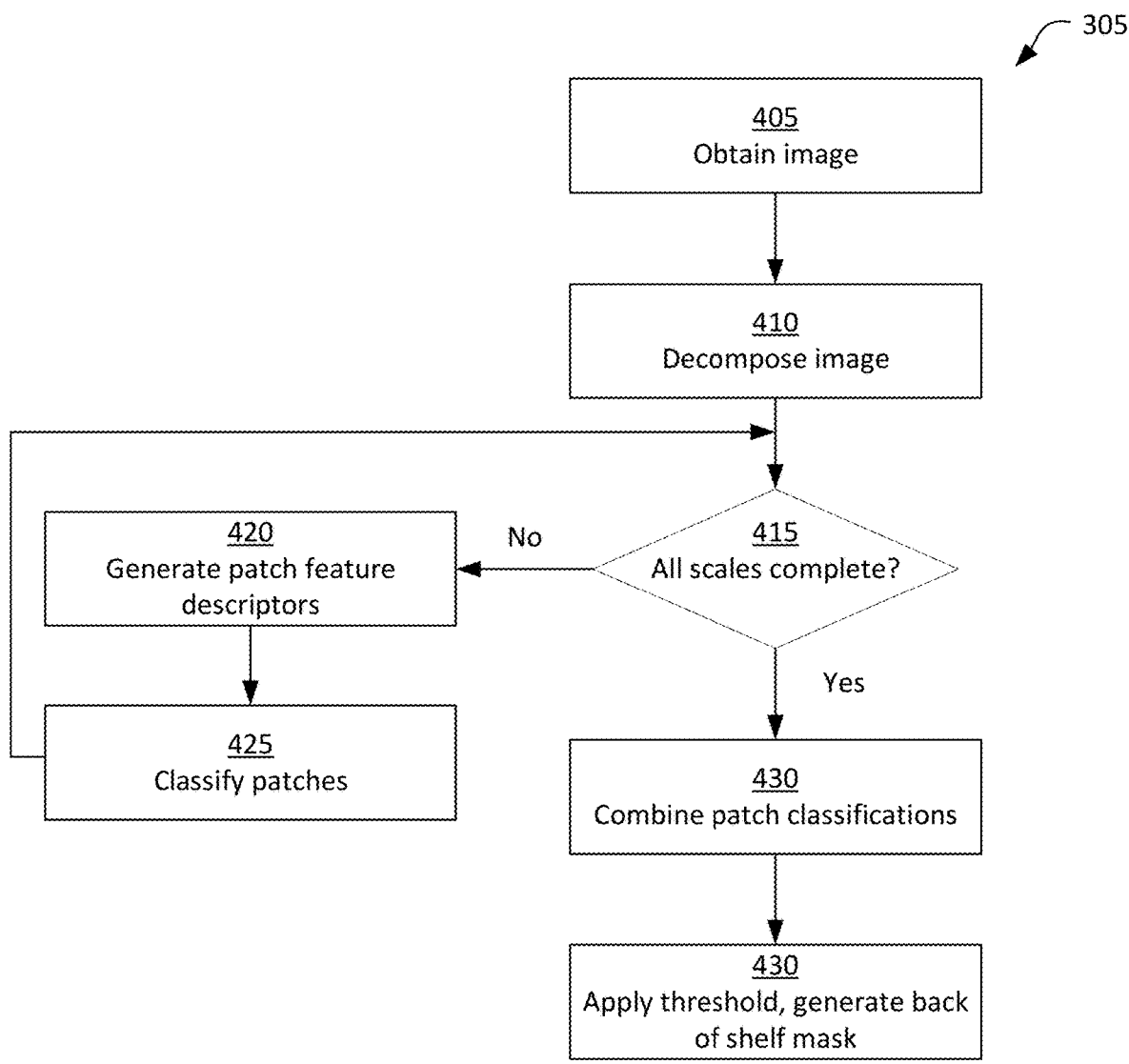
FIG. 4 is a flowchart of a method of back of shelf detection.

In the present example, the back of shelf mask is obtained by generating the back of shelf mask at the server 101, and in particular with the back of shelf detector 200. Turning to FIG. 4, a method of generating a back of shelf mask is illustrated. In other examples, block 305 of method 300 can be performed by the gap detector 204, by retrieving a previously generated back of shelf mask from the memory 122.

Figure 5:
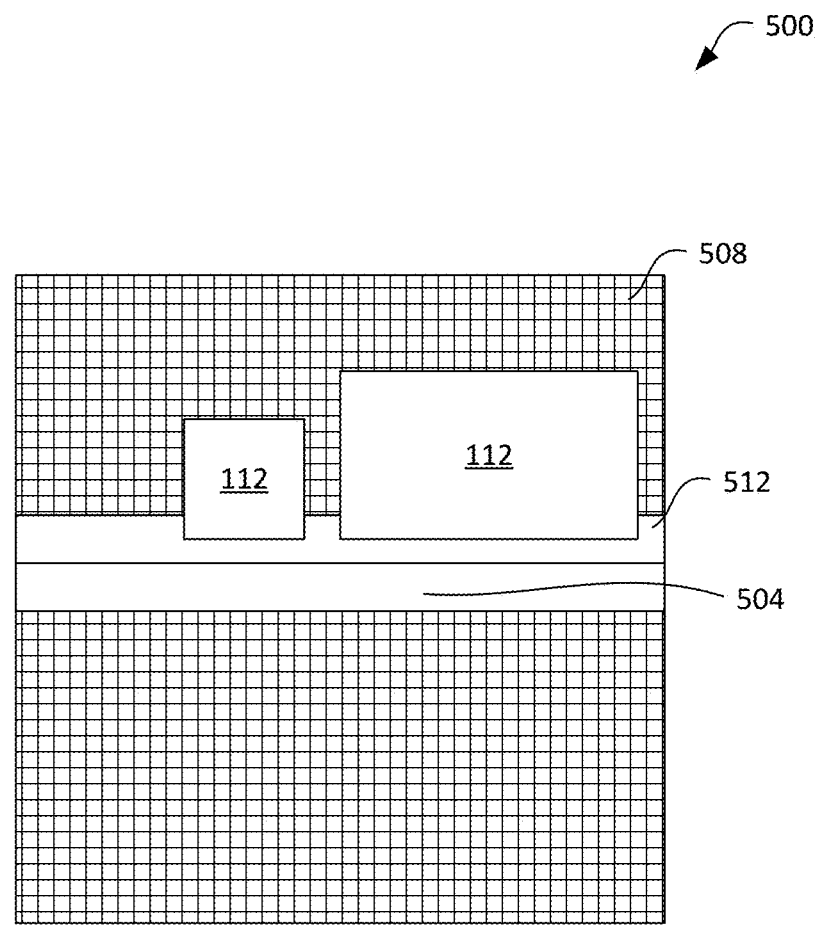
FIG. 5 is an example image obtained in the performance of the method of FIG. 4.

Referring to FIG. 4, the generation of a back of shelf mask begins at block 405, at which the detector 200 is configured to obtain a digital image of the shelf 110, for example captured by the apparatus 103 and stored in the repository 132. An example image 500 is illustrated in FIG. 5, depicting a portion of a shelf 110. In particular, the image 500 depicts a shelf edge 504 and a shelf back 508, as well as a support surface 512 extending the between the shelf edge 504 and the shelf back 508 and supporting products 112. The shelf edge 504 abuts one side of the support surface 512 extending along a horizontal plane of the shelf 110 and defines a vertical surface that is parallel to the shelf back 508. As illustrated in FIG. 5, the shelf back 508 is patterned; as will be apparent, the shelf back may have a wide variety of appearances.

Returning to FIG. 4, at block 410 the detector 200 is configured to decompose the image 500 obtained at block 405. More specifically, in the present example the pre-processor 210 is configured to decompose the image into a plurality of patches. When the image 500 is in color, the pre-processor 210 can also convert the image 500 to grey-scale, and may also normalize contrast in the image 500. In addition, in the present example, the pre-processor 210 is configured to generate a plurality of scaled versions of the image 500, and to decompose each scaled version into a plurality of patches. The generation of scaled versions of the image 500 (that is, versions of the image depicting the same region of the shelf 100 but at a differing resolutions; in other words, at different pixel densities) allows subsequent processing to account for varying distance between the apparatus 103 and the shelf 100 at the time of capture. The generation of scaled versions may be omitted in other examples.

Figure 6:
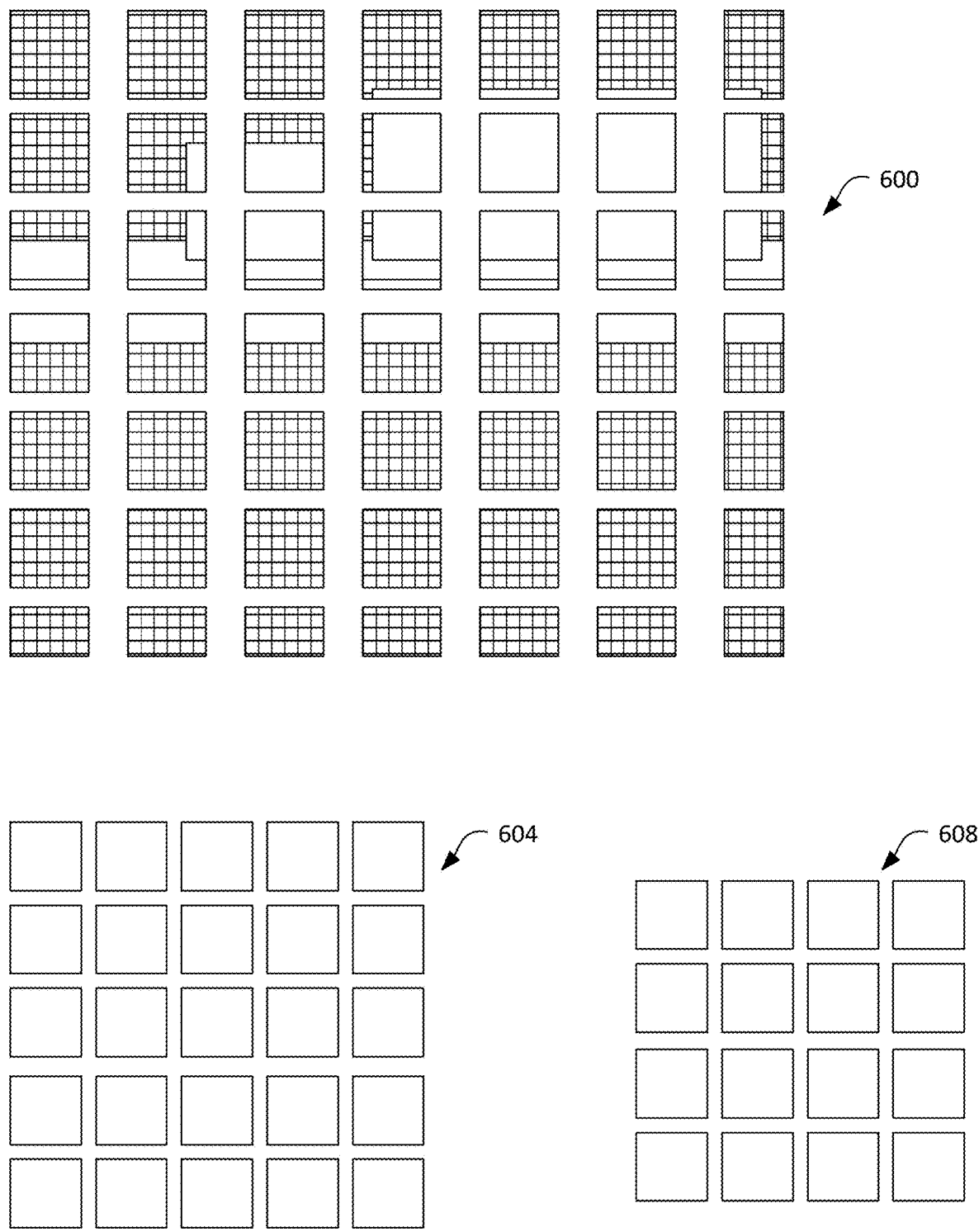
FIG. 6 illustrates decomposed and scaled versions of the image of FIG. 5.

Turning to FIG. 6, three scaled versions of the image 500 are illustrated, following decomposition into patches, each patch containing a fragment of the original image. In particular, a first set of patches 600 results from the decomposition of a full-scale version of the image 500. A second set of patches 604 results from the decomposition of a down-sampled version of the image 500, and a third set of patches 608 results from the decomposition of a further down-sampled version of the image 500. In other examples, a number of scales greater or smaller than three may be generated. The second and third sets of patches have been illustrated without the content of the image 500 for simplicity.

As shown in FIG. 6, the patches have the same resolution at each scale, and therefore different scales are decomposed into different numbers of patches. In the present example, each patch (at every scale) has a resolution of 32×32 pixels. The patches may have other resolutions in other examples; in general, the pre-processor 210 is preconfigured with a patch size determined (e.g. empirically) to be sufficiently large to encompass recognizable (as will be discussed below) features of the shelf back 508, and sufficiently small to avoid capturing both back of shelf areas and other areas of the image 500 in a majority of the patches.

Although not illustrated in FIG. 6, in some examples the patches overlap with one another. For example, the above-mentioned 32×32 pixel patches may overlap with adjacent patches by a preconfigured distance (e.g. 5 pixels).

Returning to FIG. 4, at block 415 the detector 200 is configured to determine whether all scales (if scaled versions of the image 500 are being employed) have been processed. In this example performance of the method 305, no processing has been performed, and the determination at block 415 is therefore negative. Following a negative determination at block 415, the performance of the method 305 proceeds to block 420.

At block 420, the feature generator 212 is configured to generate a feature descriptor for each of the patches generated at block 410. Various feature descriptors may be employed. In the present example, the feature descriptor is a histogram of oriented gradients (HOG) descriptor. To generate the HOG descriptors, the feature generator 212 divides each patch into cells (e.g. 8×8 pixel cells). For each pixel (64 per cell, in the present example) of each cell, the feature generator 212 then generates a gradient vector indicating the angle of the greatest change in intensity between the pixel and its neighbors, as well as the magnitude of the change in intensity. Having obtained the above-mentioned vectors, the feature generator 212 is configured to build a histogram, with bins corresponding to ranges of angles (e.g. 9 bins each accounting for an unsigned range of 20 degrees). The magnitude of each vector is added to the bin encompassing the vector's angle; in some example implementations, vectors with angles near the boundary between two adjacent bins may have their magnitudes divided between those bins. The resulting histogram for each cell is thus a 1×N vector, where N is the number of histogram bins (9 in the present example, though other numbers of bins may also be employed), containing the magnitudes assigned to each of the bins.

The feature generator 212 is then configured to concatenate the feature vectors of the cells for each patch into a single vector. Thus, in the example mentioned above, in which each 32×32 patch is divided into sixteen 8×8 cells, the feature generator 212 generates a 1×144 feature descriptor. In some examples, additional processing is performed on the cell-specific vectors mentioned above before concatenation. Specifically, in such examples the feature generator 212 is configured to perform a normalization operation on each of a plurality of cell blocks encompassing multiple cells (e.g. 2×2 cells). The normalization operation compensates for lighting and contrast variations throughout the image, and includes stacking the vectors for each cell (thus, resulting in a 36-element vector in this example). The feature generator 212 is then configured to determine the magnitude, also referred to as the L2 norm, of the stacked vector, which is the square root of the sum of the squares of each vector element. The feature generator 212 is configured to divide each of the elements in the stacked vector by the above-mentioned magnitude.

The feature generator 212 is configured to repeat the above-mentioned normalization process for each of a plurality of additional blocks of cells. In the present example, the blocks of cells overlap with each other by a width and/or height of one cell. The resulting descriptor for each patch when block normalization is employed as discussed above is 1×324: with 32×32 pixel patches, each patch is divided into a grid of 4×4 cells, which are grouped into a grid of 3×3 overlapping blocks. Each of the nine blocks yields a 36-element vector, for a total of (9×36)=324 elements.

Following the generation of feature descriptors as discussed above, at block 425, a classification is assigned to each patch for a given scale. The classification is one of a back of shelf classification and a non-back of shelf classification, and may be assigned in a variety of ways. In the present example, the feature generator 212 is configured to stack the feature descriptors for each patch into a single M×144 descriptor (or a M×324 descriptor when block normalization is employed as described above) corresponding to the entire image, where M is the number of patches. The stacked descriptor is provided as an input to the classifier 214. In the present example, the classifier is a trained neural network, which accepts the stacked descriptor as input and generates, as an output, a pair of scores for each patch. The pair of scores includes a back of shelf score indicating a level of confidence that the relevant patch depicts the shelf back 508, and a non-back of shelf score indicating a level of confidence that the relevant patch does not depict the shelf back 508. The classifier 214 is configured, in the present example, to select the greatest of the scores for presentation as output to the mask generator 216. More specifically, when the greater score corresponds to the back of shelf classification, the score is selected for further processing. When the greater score corresponds to the non-back of shelf classification, the score is selected and subtracted from one before being presented for further processing, such that all the scores employed downstream of classification represent the confidence of a back of shelf classification for their respective patches.

Once the patch classification for a given image scale is complete, the performance of method 305 returns to block 415. Thus, the feature descriptor generation and classification is repeated for each set of patches shown in FIG. 6, following which the determination at block 415 is affirmative.

Figure 7A:
FIGS. 7A and 7B are a back of shelf score mask and a back of shelf mask following application of a score threshold, respectively.

In response to an affirmative determination at block 415, the performance of the method 305 proceeds to block 430. At block 430, the mask generator 216 is configured to combine the patch classifications from each scaled version of the image into a single score mask. The generation of classification scores for the patches at each scale results in a grid of patch scores, for example with the score being assigned as an intensity value to a point located at the center of the patch. At block 430, the mask generator 216 is configured to return the score grids from each scale to a single common scale (e.g. the original scale of the image obtained at block 405). FIG. 7A illustrates an example of a score mask generated at block 430, in which the lighter areas represent a greater degree of confidence that the corresponding areas of the original image depict the shelf back 508.

Figure 7B:
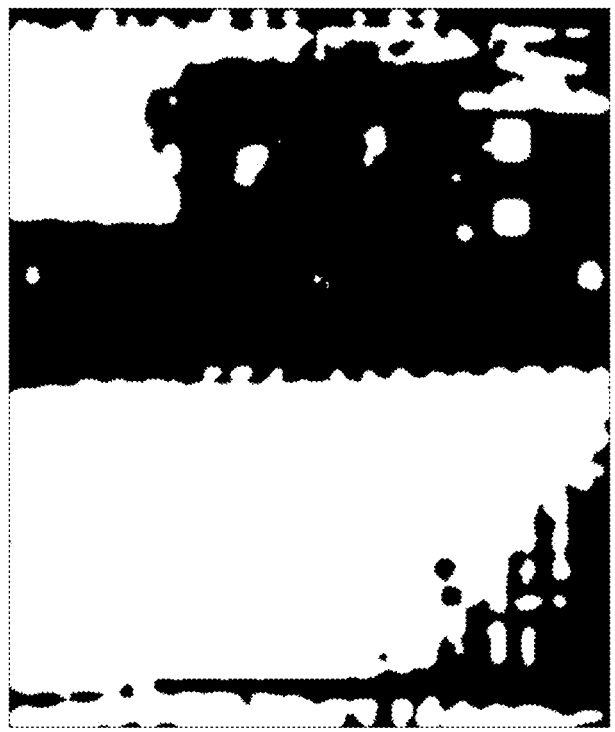

The mask generator 216 is then configured to apply a threshold to the score mask shown in FIG. 7A, to convert the score mask into a binary mask indicating whether each pixel depicts the shelf back 508 or does not depict the shelf back 508. Any pixels in the score mask that do not meet the threshold are set to a low intensity, and any pixels that do meet the threshold are set to a high intensity. FIG. 7B depicts the result of applying the score threshold to the score mask of FIG. 7A. When the back of shelf mask has been generated, performance of the method 300 continues.

Returning to FIG. 3, the performance of block 305 is completed when the gap detector 204 obtains the back of shelf mask from the detector 200. As discussed above, the back of shelf mask contains indications (in the form of high or low intensity values), for each of a plurality of areas of the back of shelf mask, of a classification assigned to the area and selected from a shelf back classification and a non-shelf back classification. Referring briefly to FIG. 7B, the white areas are those having the back of shelf classification, while the black areas are those having the non-back of shelf classification.

At block 310, the gap detector 204, having obtained the back of shelf mask, is configured to obtain a location of the shelf edge 504 relative to the back of shelf mask. In some examples, the shelf edge location is stored in the memory 122, and at block 310 the gap detector 204 is configured to retrieve the shelf edge location from memory. For example, the shelf edge location may be stored in a frame of reference corresponding to the retail environment itself. In such examples, the image obtained at block 405 may be registered to the common frame of reference by another component of the control application 128 (for example, using navigational data generated by the apparatus 103), and thus the back of shelf mask is also registered to the common frame of reference.

Figure 8:
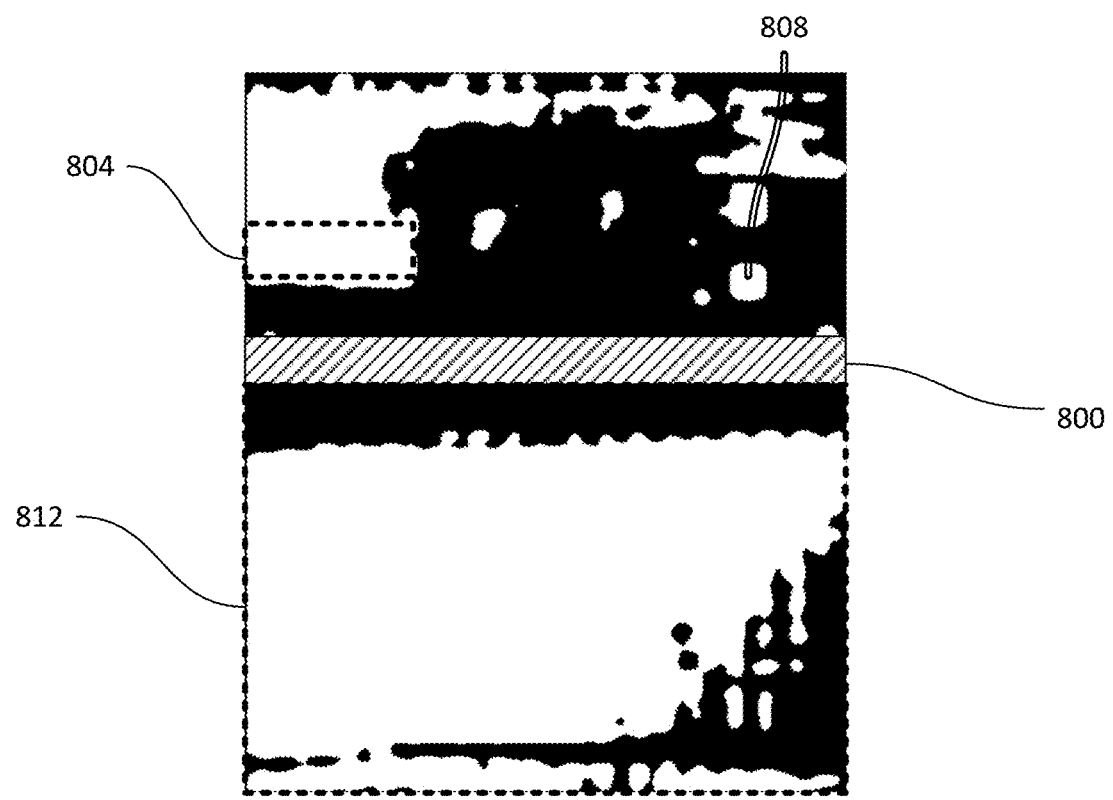
FIGS. 8-10B illustrate certain operations performed on the mask of FIG. 7B in the performance of the method of FIG. 3.

In other examples, the gap detector obtains the location of the shelf edge by detecting the shelf edge location from depth measurements obtained by the apparatus 103 corresponding to the image obtained at block 405. The depth measurements are registered to the images obtained by the apparatus 103, and thus the location of each depth measurement relative to the original image and the back of shelf mask is known. At block 310, in such examples, the shelf edge detector 220 is configured to detect the shelf edge from the depth measurements, for example by identifying a contiguous set of depth measurements located within a threshold distance of a particular plane. The shelf edge, when detected, may be overlaid on the back of shelf mask as a bounding box, as shown in FIG. 8, in which the shelf edge is illustrated as an overlay 800.

At block 315, the region segmentor 224 is configured to select an area of the back of shelf mask, classified as back of shelf, that is adjacent to the shelf edge location (i.e. to the overlay 800, in the present example). In particular, the region segmentor 224 is configured to locate any back of shelf areas of the mask that are within a preconfigured threshold distance of the upper side of the shelf edge bounding box 800. As shown in FIG. 8, the area surrounded by the bounding box 804 satisfies the threshold distance, and the region segmentor 224 is therefore configured to select the area 804 at block 315. The area 804, and any other areas satisfying the distance threshold, may be selected using a variety of mechanisms. As illustrated in FIG. 8, the area 804 is selected as the rectangular area extending away from the overlay 800 until a non-back of shelf area is reached. In other examples, the region segmentor 224 is instead configured to adjust the selected area to maximize the area covered by the selection. In the example of FIG. 8, such a selection would include a rectangular area with a narrower base and a greater height. In further examples, the region segmentor 224 is configured to select more complex shapes than the illustrated rectangular bounding box 804.

As will now be apparent, other areas, such as the area 808, are also within the threshold distance of the shelf edge overlay 800. However, the segmentor 224 is configured, in the present example, to disregard any areas portions of the mask having areas below a threshold. Such small portions may indicate, for example, an incorrect classification of a product 112 as depicting the shelf back 508 due to lighting or other image capture artifacts.

The region segmentor 224 is also configured, at block 315, to disregard any portions of the mask below the shelf edge overlay 800, as well as any portions beyond (e.g. left or right of) the ends of a shelf edge overlay, when the shelf edge overlay does not traverse the entire mask. Thus, in the present example, the region 812 of the mask is disregarded during the performance of block 315. Regions of the mask that are disregarded can be deleted (reducing the size of the mask), or simply assigned a non-gap classification without further analysis. Regions such as the region 812 are disregarded because, in the absence of a shelf edge overlay below the region 812, there is too little information available to the gap detector 204 to determine whether the region 812 is adjacent to the upper side of a shelf edge. The region 812 is instead assessed during a further performance of the method 300, beginning with an image of a different portion of the shelf 110 (specifically, a portion below that resulting in the mask shown in FIG. 8).

Figure 9:
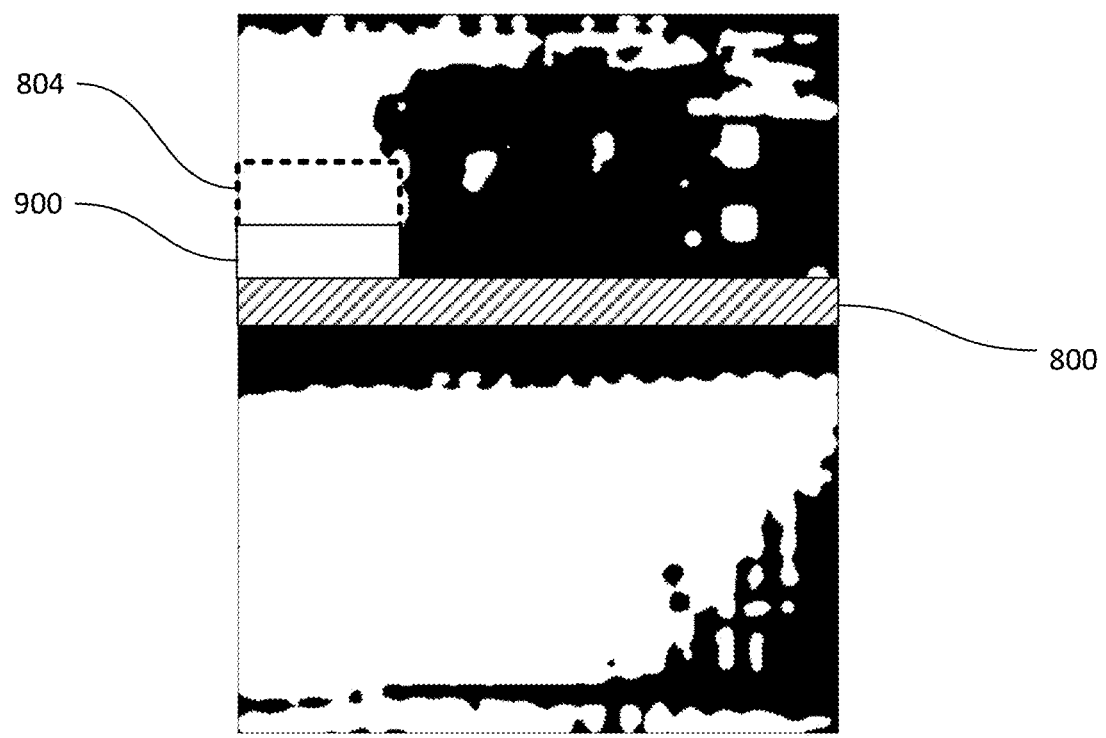

At block 320, the region segmentor 224 is configured to generate a joining area between the shelf edge overlay 800 and the selected area 804. Referring to FIG. 9, a joining area 900 is illustrated, extending from the shelf edge overlay 800 to the selected area 804. The joining area 900, as will be seen below, serves to classify the shelf support surface, if visible in the image, as back of shelf (and thus as a gap).

The selected area 804 and the joining area 900 are assigned a gap classification by the mask generator 228. In the present example, the mask generator 228 is also configured to expand the selected area 804. As seen in FIG. 9, a portion of the back of shelf mask classified as back of shelf extends up from the selected area, as well as towards the right along the top of the mask. The mask generator 228 is configured to perform a region growth operation beginning at the centroid of the selected area 804. As will be apparent to those skilled in the art, the region growth operation determines, for each point outwards from the starting point, whether to include the point in a region (e.g. based on the intensity of the point under consideration and its neighbors). The region growth operation serves to join discrete (i.e. separated from each other) back of shelf-classified areas that are likely to represent contiguous portions of the shelf back 508, but were not classified as such due to imaging artifacts.

Figure 10A:
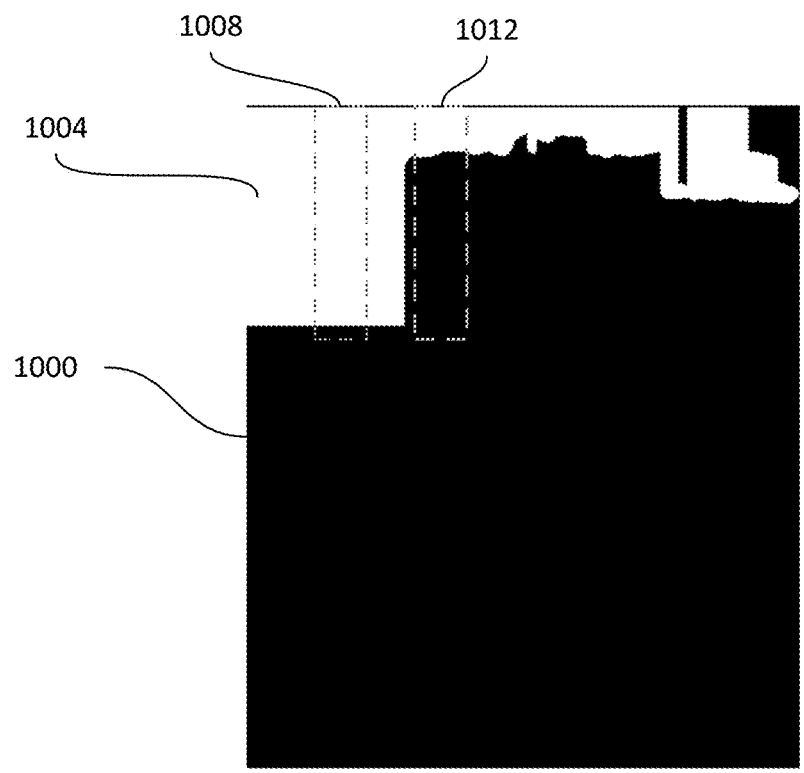

Turning to FIG. 10A, a gap mask 1000 is illustrated following the completion of the region growth operation. As illustrated, a contiguous area 1004 is classified as a gap, encompassing both the area 804 and the joining area 900, as well as several areas classified as back of shelf that were previously distinct (as shown in FIGS. 8 and 9). As also shown in FIG. 10A, the mask generator 228 is configured to assign the previously discussed disregarded areas a non-gap classification (a low intensity, in the present example).

Figure 10B:
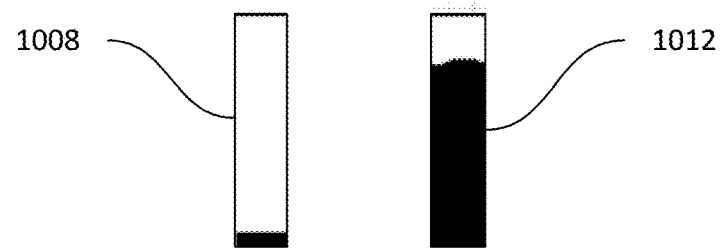

Referring again to FIG. 3, at block 325 the gap detector 204 is configured to perform a depth-based sensor validation of the gap mask illustrated in FIG. 10A. In particular, the validator 232 is configured to divide the gap mask into a plurality of vertical slices. Two example slices 1008 and 1012 are illustrated in FIG. 10A, and are shown in isolation in FIG. 10B. In the present example, the slices generated from the gap mask are 100 pixels in width; however, in other embodiments another suitable slice width can be employed. The slices can also overlap in some examples. The height of the slices is selected by the validator 232 to extend substantially from the shelf edge location (not shown in FIG. 10A) to the upper edge of the gap mask 1000. In other examples, in which more than one shelf is depicted in the initial image, the height of the vertical slices is selected by the validator 232 to extend from the upper side of one shelf edge location to the lower side of the adjacent shelf edge location. In other words, a plurality of sets of vertical slices are generated, each corresponding to the area adjacent and above a particular shelf.

For each slice, the validator 232 is configured to determine a proportion of the point depths corresponding to that slice that exceed a median point depth for the slice. In other words, the validator 232 is configured to assess whether the depth measurements corresponding to a given slice are concentrated near or on a plane corresponding to the shelf back 508, or whether the depth measurements are dispersed at various depths between the shelf back 508 and the shelf edge 504 (indicating the presence of a product 112 in the slice).

Figure 11:
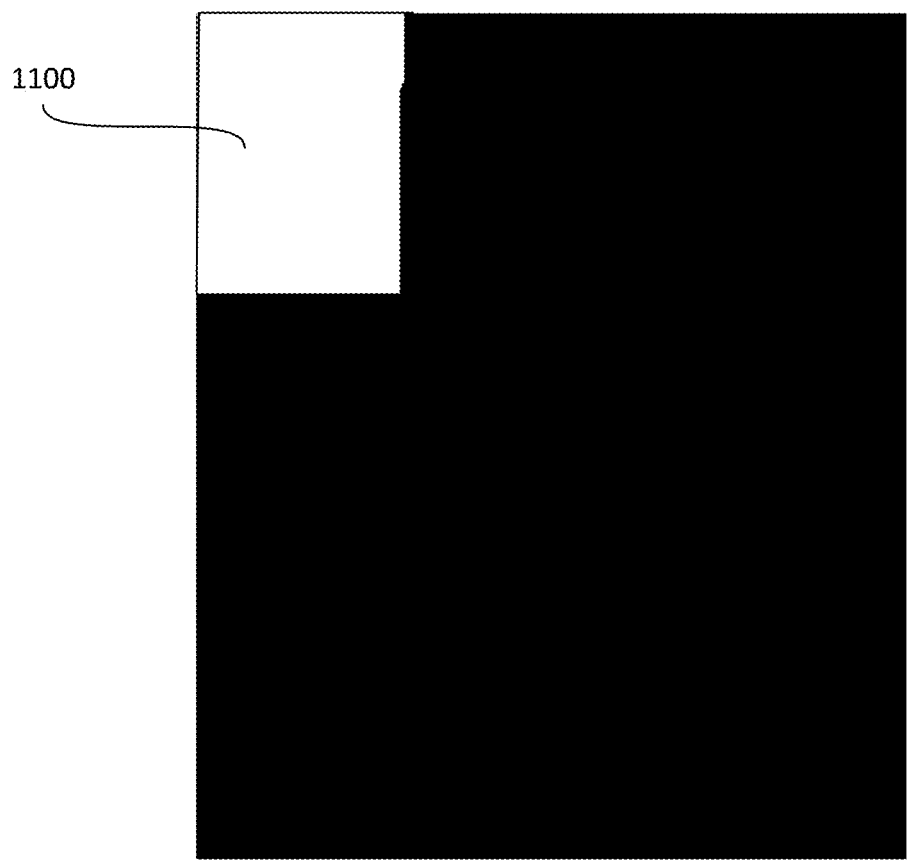
FIG. 11 is a gap mask resulting from the performance of the method of FIG. 3.

In the present example, the validator 232 determines a median of the subset of depth sensor measurements (obtained earlier and registered to the mask as discussed above) within each slice, and further determines what proportion of the depth measurements exceed the median. For example, the validator 232 is configured to generate a histogram of the depth measurements within each slice and determine the number of depth measurements that are allocated to histogram bins representing depths greater than the median. If the proportion is greater than a predetermined depth distribution threshold (specifying a proportion of depth measurements exceeding the median), any gap represented in the slice is likely to result from an area of the shelf back 508 visible above a product 112, rather than from a true gap (i.e. an absence of product 112 on the shelf). The validator 232 is therefore configured to assign a non-gap classification to the entirety of any slice exceeding the above-mentioned threshold. Slices that do not exceed the threshold are preserved without modification. FIG. 11 illustrates the mask 1000 after performance of depth-based validation as described above. As seen in FIG. 11, a gap-classified area 1100 remains in the gap mask, and the remaining areas classified as gaps in FIG. 10A have been reclassified as non-gap areas following depth sensor validation.

Following the performance of block 325, the gap detector 204 is configured to present the gap mask. The presentation of the gap mask can be implemented in a variety of ways. In the present example, the gap detector 204 is configured to generate bounding box coordinates (e.g. in the common frame of reference mentioned earlier) corresponding to each gap area indicated in the mask. In other examples, the gap detector 204 is configured to render the gap mask on a display, in addition to or instead of the generation of gap bounding boxes.

As will now be apparent, some images captured by the apparatus 103 may depict more than one shelf. The process of identifying a shelf edge location in relation the image, segmenting the image and assigning gap classifications to areas of the image (i.e. blocks 310-320 of the method 300) may be repeated for each shelf edge in the image, and the result overlaid at block 325.

In certain examples, the images captured by the apparatus 103 may overlap, and thus a plurality of images may be obtained that represent the same portion of a shelf 110. In such examples, each image can be processed independently. In some examples, however, the server 101 is configured to identify sections of the images that do not overlap with adjacent images, and to process only those sections as described above. In other words, only the section of an image that depicts a portion of the shelf 110 not depicted by any other images is processed in such examples.

In the foregoing specification, specific embodiments have been described. However, one of ordinary skill in the art appreciates that various modifications and changes can be made without departing from the scope of the invention as set forth in the claims below. Accordingly, the specification and figures are to be regarded in an illustrative rather than a restrictive sense, and all such modifications are intended to be included within the scope of present teachings.

The benefits, advantages, solutions to problems, and any element(s) that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued.

Moreover in this document, relational terms such as first and second, top and bottom, and the like may be used solely to distinguish one entity or action from another entity or action without necessarily requiring or implying any actual such relationship or order between such entities or actions. The terms "comprises," "comprising," "has", "having," "includes", "including," "contains", "containing" or any other variation thereof, are intended to cover a non-exclusive inclusion, such that a process, method, article, or apparatus that comprises, has, includes, contains a list of elements does not include only those elements but may include other elements not expressly listed or inherent to such process, method, article, or apparatus. An element proceeded by "comprises . . . a", "has . . . a", "includes . . . a", "contains . . . a" does not, without more constraints, preclude the existence of additional identical elements in the process, method, article, or apparatus that comprises, has, includes, contains the element. The terms "a" and "an" are defined as one or more unless explicitly stated otherwise herein. The terms "substantially", "essentially", "approximately", "about" or any other version thereof, are defined as being close to as understood by one of ordinary skill in the art, and in one non-limiting embodiment the term is defined to be within 10%, in another embodiment within 5%, in another embodiment within 1% and in another embodiment within 0.5%. The term "coupled" as used herein is defined as connected, although not necessarily directly and not necessarily mechanically. A device or structure that is "configured" in a certain way is configured in at least that way, but may also be configured in ways that are not listed.

It will be appreciated that some embodiments may be comprised of one or more generic or specialized processors (or "processing devices") such as microprocessors, digital signal processors, customized processors and field programmable gate arrays (FPGAs) and unique stored program instructions (including both software and firmware) that control the one or more processors to implement, in conjunction with certain non-processor circuits, some, most, or all of the functions of the method and/or apparatus described herein. Alternatively, some or all functions could be implemented by a state machine that has no stored program instructions, or in one or more application specific integrated circuits (ASICs), in which each function or some combinations of certain of the functions are implemented as custom logic. Of course, a combination of the two approaches could be used.

Moreover, an embodiment can be implemented as a computer-readable storage medium having computer readable code stored thereon for programming a computer (e.g., comprising a processor) to perform a method as described and claimed herein. Examples of such computer-readable storage mediums include, but are not limited to, a hard disk, a CD-ROM, an optical storage device, a magnetic storage device, a ROM (Read Only Memory), a PROM (Programmable Read Only Memory), an EPROM (Erasable Programmable Read Only Memory), an EEPROM (Electrically Erasable Programmable Read Only Memory) and a Flash memory. Further, it is expected that one of ordinary skill, notwithstanding possibly significant effort and many design choices motivated by, for example, available time, current technology, and economic considerations, when guided by the concepts and principles disclosed herein will be readily capable of generating such software instructions and programs and ICs with minimal experimentation.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

The invention claimed is:

1. A method of detecting a back of a shelf for supporting objects, comprising:
    obtaining, by an imaging controller, an image depicting a shelf having a shelf edge and a support surface extending from the shelf edge to a shelf back;
    decomposing, by the imaging controller, the image into a plurality of patches;
    for each patch:
        generating a feature descriptor;
        based on the feature descriptor, assigning one of a shelf back classification and a non-shelf back classification to the patch;
    generating a mask corresponding to the image, the mask containing an indication of the classification assigned to each of the patches, wherein the indication of the classification assigned to each of the patches comprises one of a plurality of intensity values; and
    presenting the mask to a gap detector for detection of gaps from the mask.

2. The method of claim 1, wherein assigning the classification to each patch includes determining a confidence value corresponding to the assigned classification.

3. The method of claim 2, wherein generating the mask comprises, for each patch:

assigning one of two intensity values to each patch based on the confidence value and a confidence threshold.

4. The method of claim 1, further comprising:
prior to decomposing the image, converting the image to greyscale.

5. The method of claim 1, further comprising:
prior to decomposing the image, performing a contrast normalization operation on the image.

6. The method of claim 1, further comprising:
generating a plurality of scaled versions of the image;
repeating the decomposing, generating a feature descriptor, and assigning a classification for each scaled version; and
wherein generating the mask includes generating a sub-mask corresponding to each scaled version, and combining the sub-masks.

7. The method of claim 1, wherein the feature descriptor is a histogram of oriented gradients (HOG) descriptor.

8. The method of claim 1, further comprising:
obtaining, by the imaging controller, a location of the shelf edge within the mask;
generating, by the imaging controller, a gap mask identifying a subset of the areas having shelf back classifications as gaps on the shelf, by:
selecting an area of the mask within a predetermined distance of the shelf edge location and having the shelf back classification; and
generating a joining area between the selected area and the shelf edge location; and
assigning a gap classification to the selected area and the joining area; and
presenting the gap mask.

9. A method of detecting, by an imaging controller, gaps in an image of a shelf having a shelf edge and a support surface for supporting objects extending from the shelf edge to a shelf back, the method comprising:
obtaining, by the imaging controller, a mask generated from the image and containing indications, for each of a plurality of areas of the mask, of a classification assigned to the area and selected from a shelf back classification and a non-shelf back classification;
obtaining, by the imaging controller, a location of the shelf edge within the mask;
generating, by the imaging controller, a gap mask identifying a subset of the areas having shelf back classifications as gaps on the shelf, by:
selecting an area of the mask within a predetermined distance of the shelf edge location and having the shelf back classification; and
generating a joining area between the selected area and the shelf edge location; and
assigning a gap classification to the selected area and the joining area; and
presenting the gap mask.

10. The method of claim 9, wherein generating the gap mask further comprises:
discarding a portion of the mask having a preconfigured position relative to the shelf edge location.

11. The method of claim 10, wherein the preconfigured position includes below the shelf edge location.

12. The method of claim 10, wherein the preconfigured position includes horizontally spaced beyond an end of the shelf edge location.

13. The method of claim 9, wherein generating the gap mask further comprises:

comparing each area having a shelf back classification to a preconfigured area threshold, and discarding any areas that do not meet the threshold.

14. The method of claim 9, wherein generating the gap mask further comprises:
performing a region growth operation on the selected area with the joining area; and
assigning the gap classification to a grown region resulting from the region growth operation.

15. The method of claim 9, further comprising:
obtaining depth data captured by a depth sensor and indicating a point depth for each of a plurality of points in the gap mask;
dividing the gap mask into a plurality of vertical slices;
for each vertical slice of the gap mask:
determining a proportion of the point depths that exceed a median point depth for the vertical slice; and
assigning a non-gap classification to the vertical slice when the proportion does not meet a preconfigured depth distribution threshold.

16. The method of claim 9, wherein obtaining the mask comprises:
obtaining, by the imaging controller, the image;
decomposing, by the imaging controller, the image into a plurality of patches;
for each patch:
generating a feature descriptor;
based on the feature descriptor, assigning one of the shelf back classification and the non-shelf back classification to the patch; and
generating the mask corresponding to the image, the mask containing an indication of the classification assigned to each of the patches.

17. A server for detecting a back of a shelf for supporting objects, comprising:
a memory storing an image depicting a shelf having a shelf edge and a support surface extending from the shelf edge to a shelf back; and
an imaging controller comprising:
a pre-processor configured to decompose the image into a plurality of patches;
a back of shelf detector configured to:
(a) for each patch:
generate a feature descriptor;
based on the feature descriptor, assign one of a shelf back classification and a non-shelf back classification to the patch;
(b) generate a mask corresponding to the image, the mask containing an indication of the classification assigned to each of the patches, wherein the indication of the classification assigned to each of the patches comprises one of a plurality of intensity values;
the back of shelf detector further configured to present the mask.

18. A server for detecting gaps in an image of a shelf having a shelf edge and a support surface for supporting objects extending from the shelf edge to a shelf back, the system comprising:
a memory storing a mask generated from the image, the mask containing indications, for each of a plurality of areas of the mask, of a classification assigned to the area and selected from a shelf back classification and a non-shelf back classification; and
an imaging controller comprising:

a shelf edge detector configured to obtain a location of the shelf edge within the mask;

a gap generator configured to generate a gap mask identifying a subset of the areas having shelf back classifications as gaps on the shelf, by:

selecting an area of the mask within a predetermined distance of the shelf edge location and having the shelf back classification; and generating a joining area between the selected area and the shelf edge location; and assigning a gap classification to the selected area and the joining area; and the gap generator further configured to present the gap mask.

19. The method of claim 1 wherein the mask is a binary intensity mask.

20. The method of claim 1, wherein patches that do not meet a back of shelf confidence threshold are assigned a first intensity value and patches that meet the back of shelf confidence threshold are assigned a second intensity value.

* * * * *